June 5, 1951     J. C. VELTMAN ET AL     2,555,521
TYPE ACTION FOR TYPEWRITING MACHINES
Filed Nov. 18, 1946     14 Sheets-Sheet 1
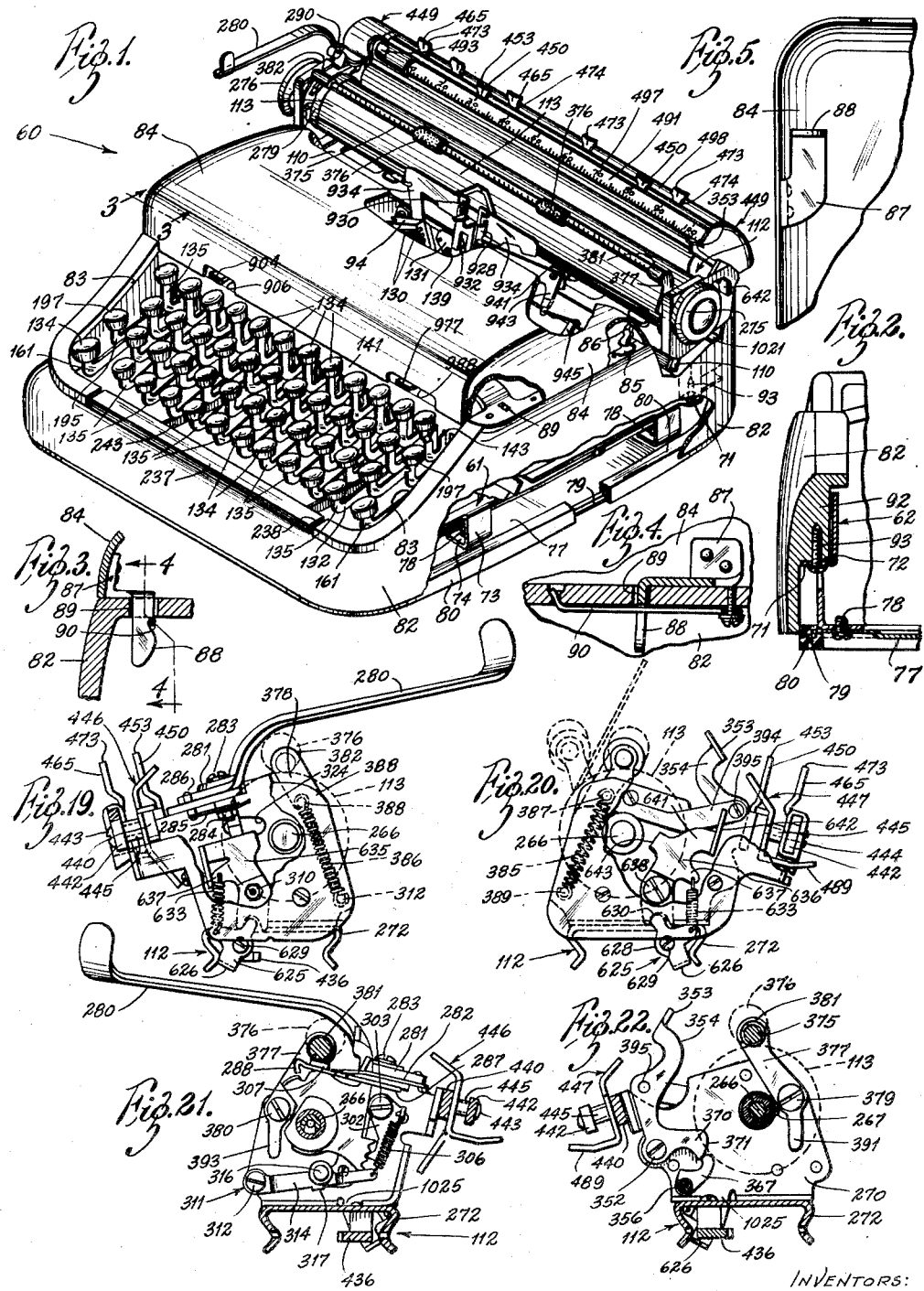
INVENTORS:
JOHN C. VELTMAN,
WILLIAM O. MICHELSEN,
By Kingsland, Rogers & Ezell
ATTORNEYS.

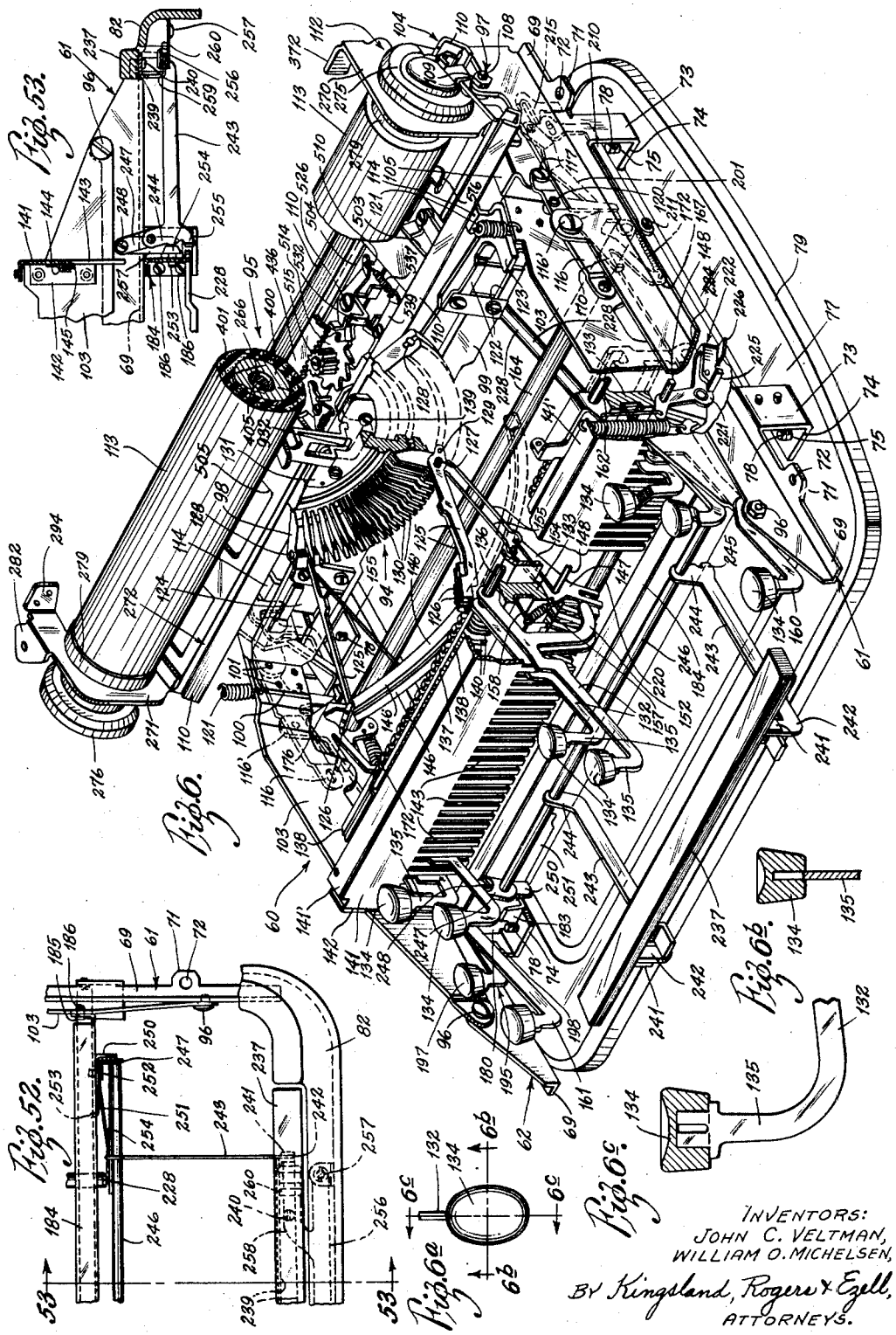

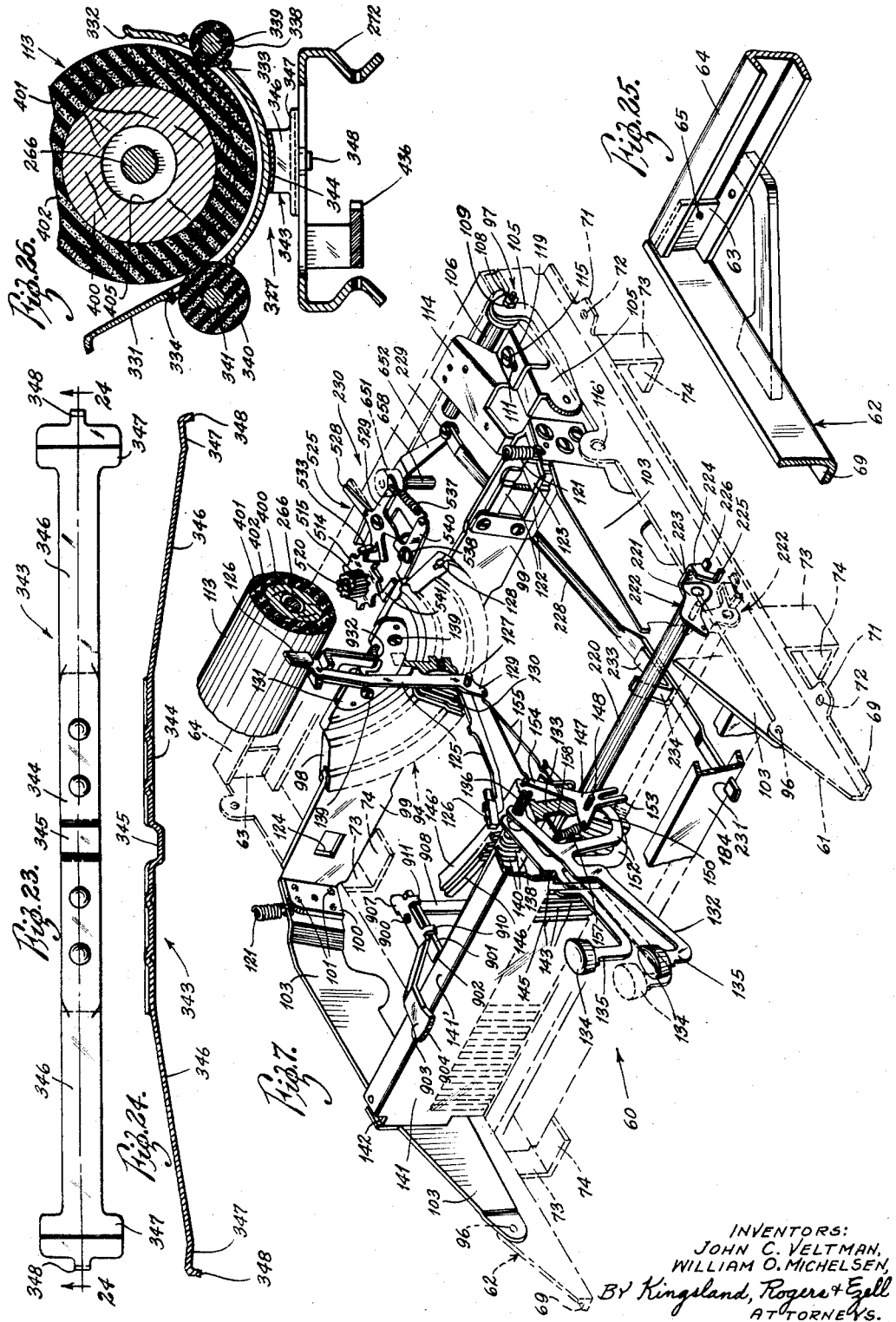

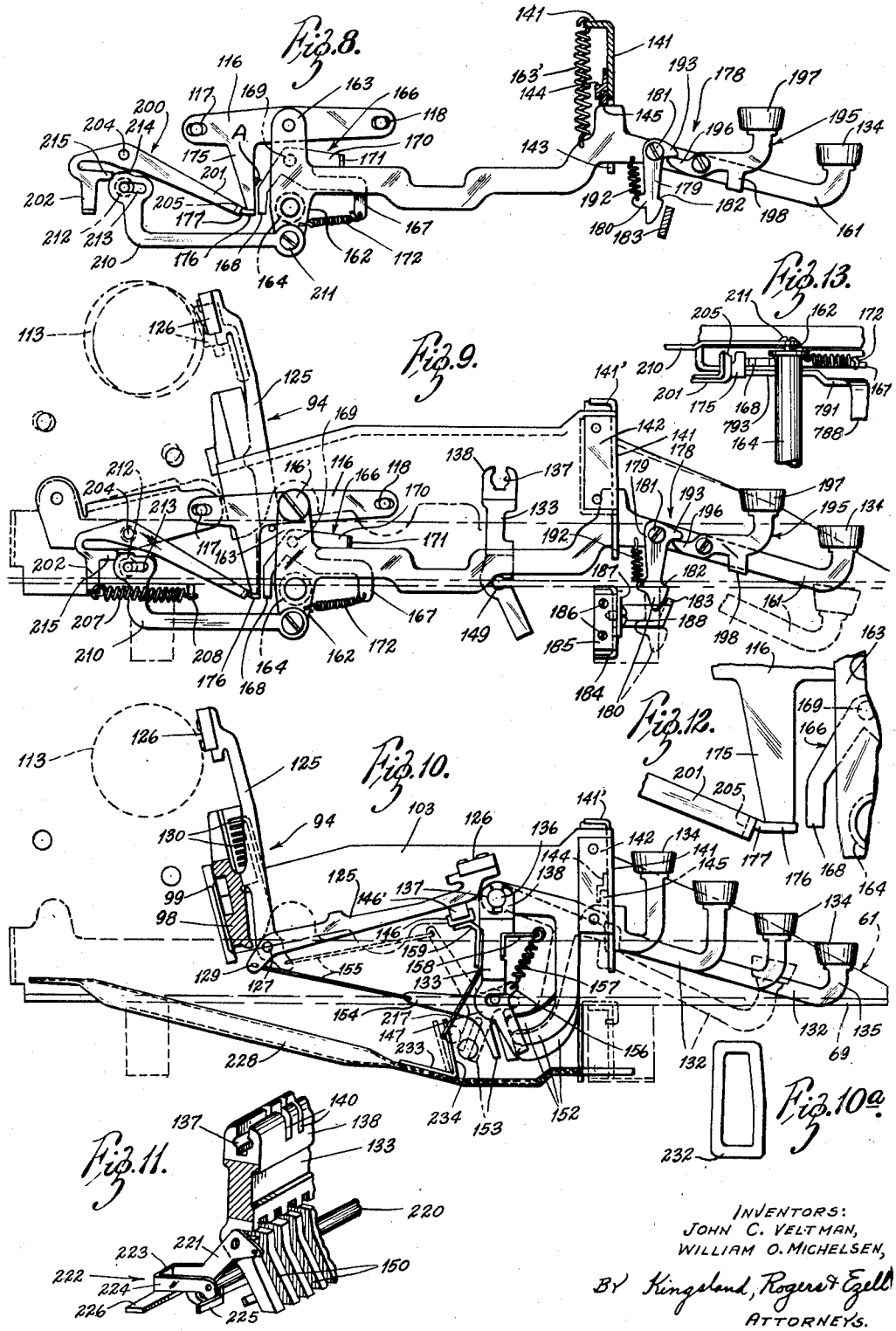

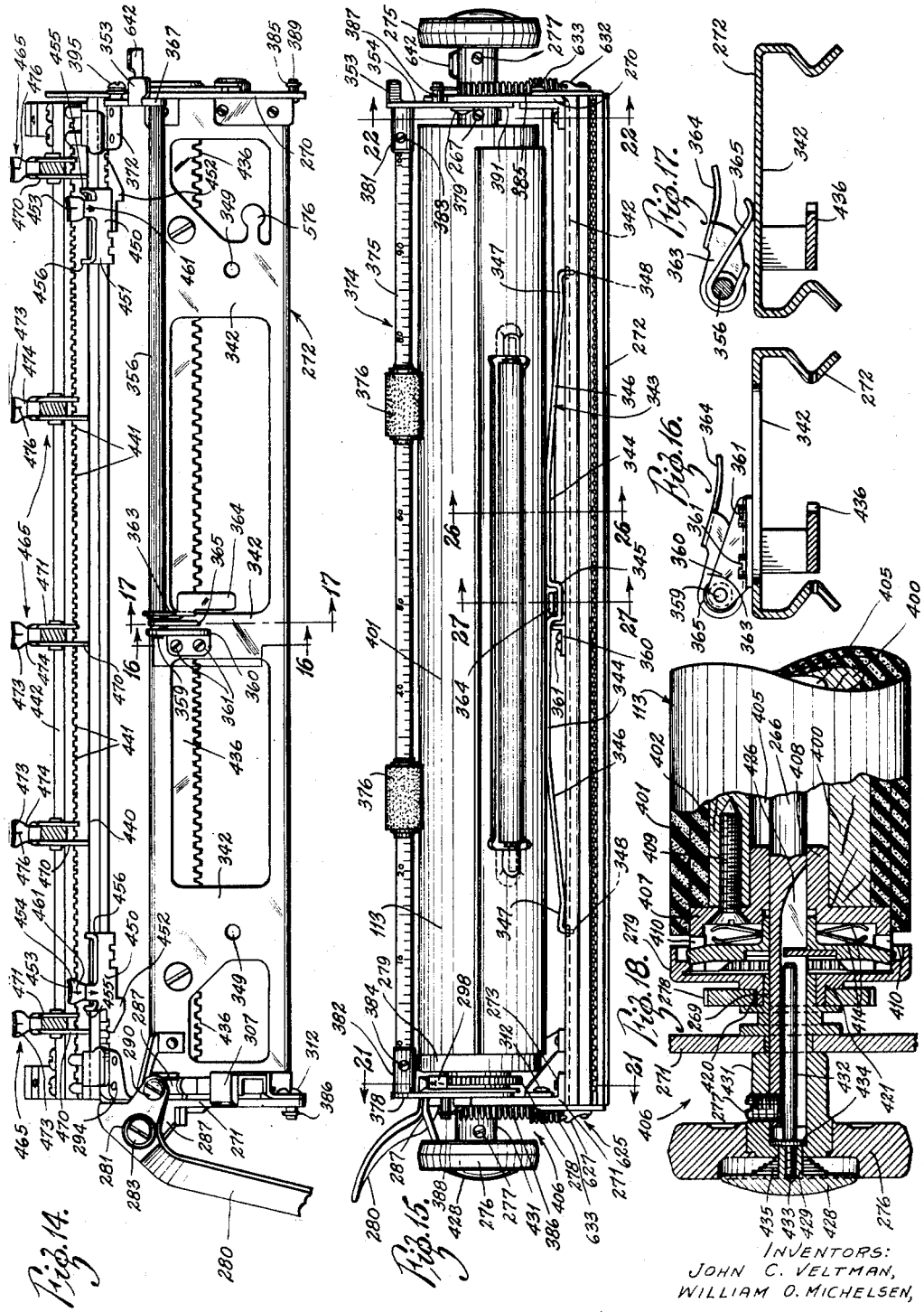

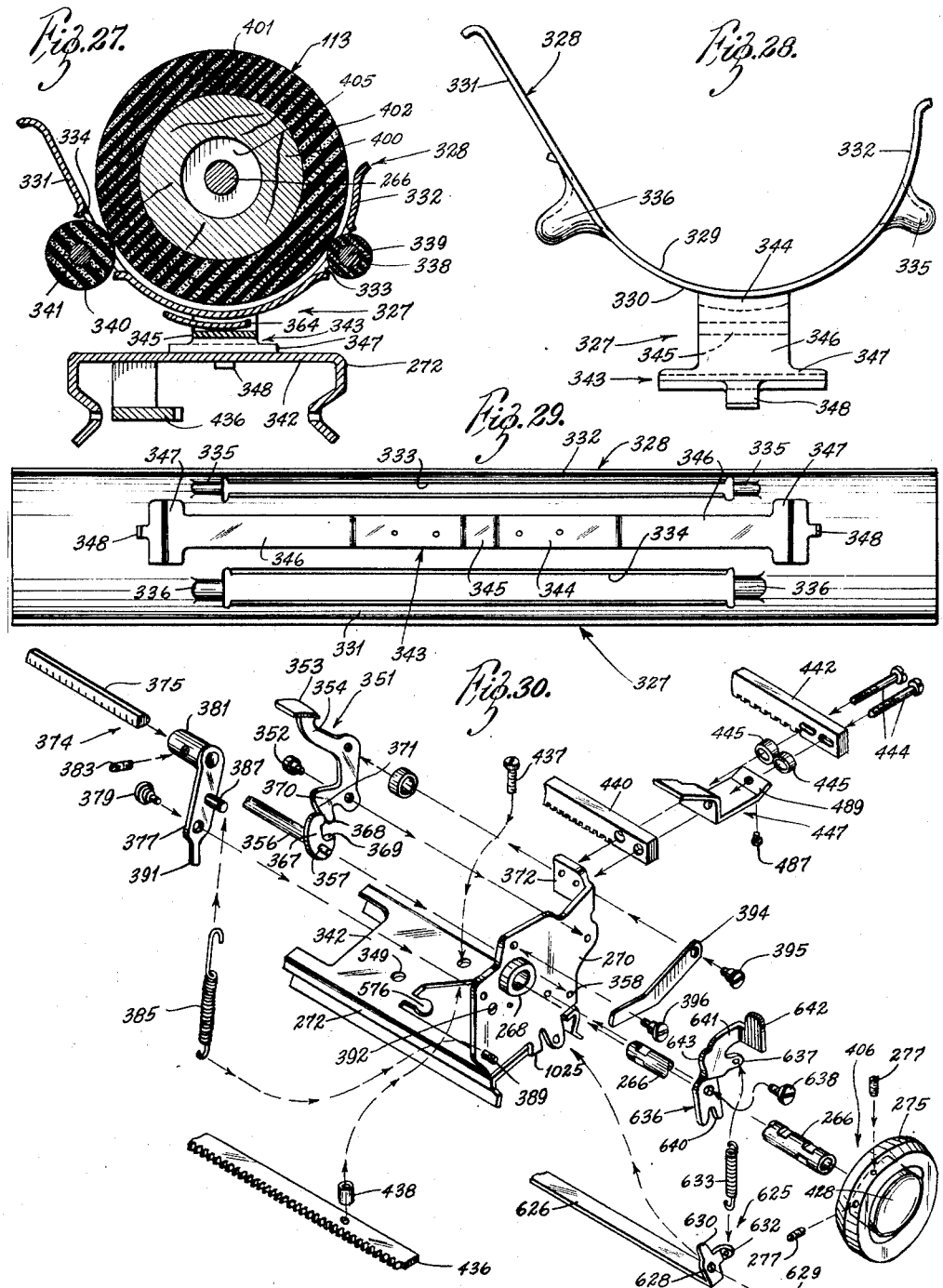

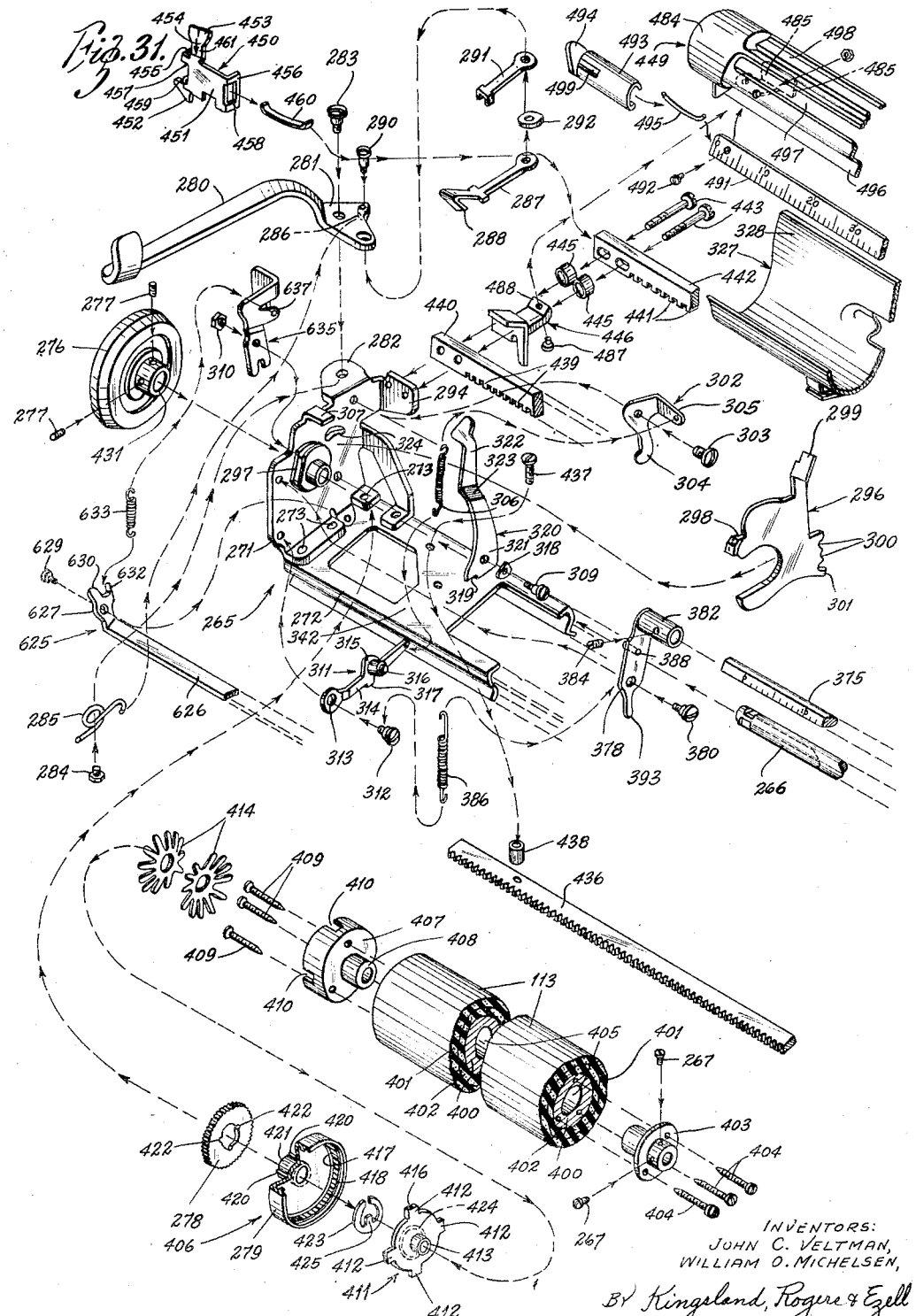

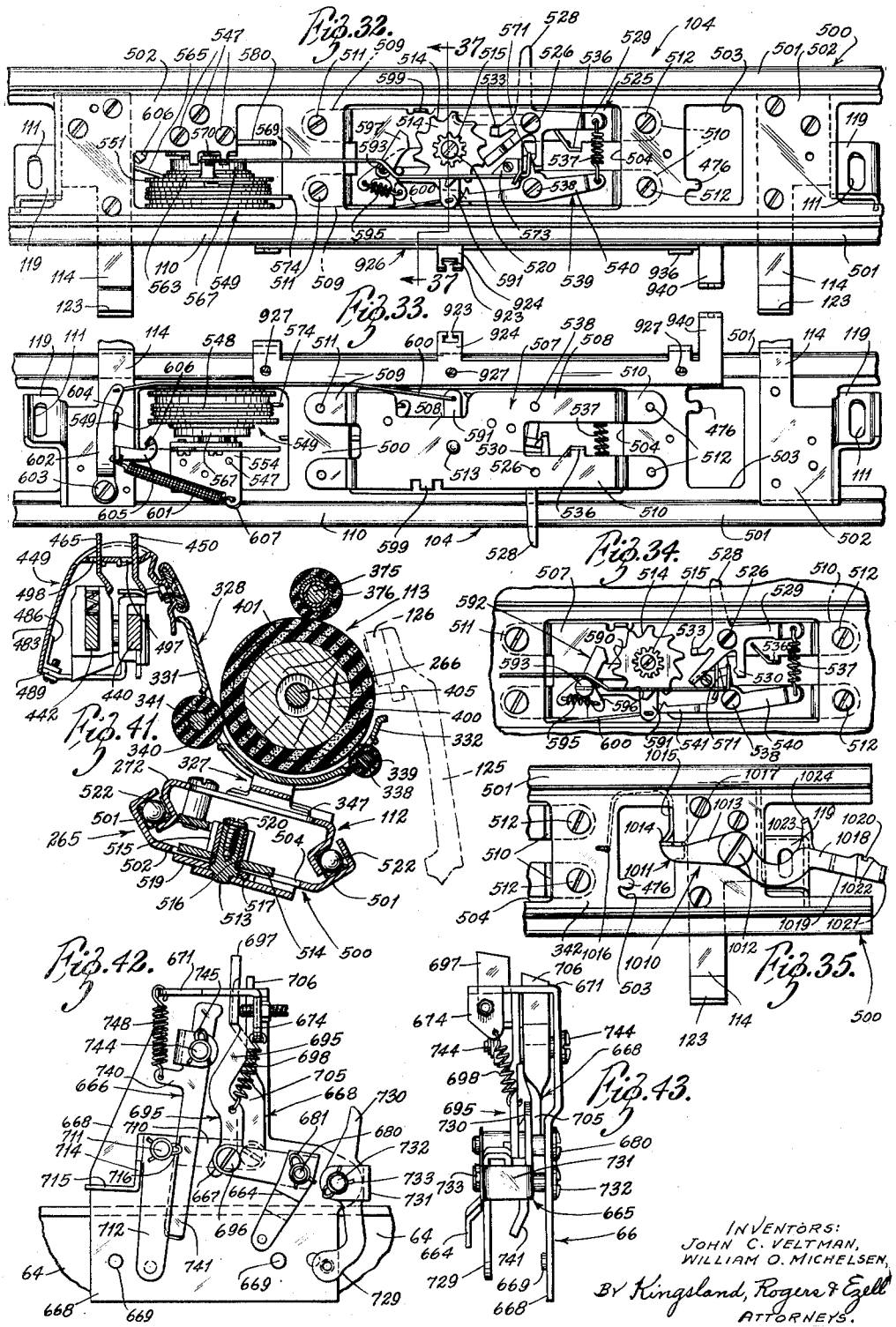

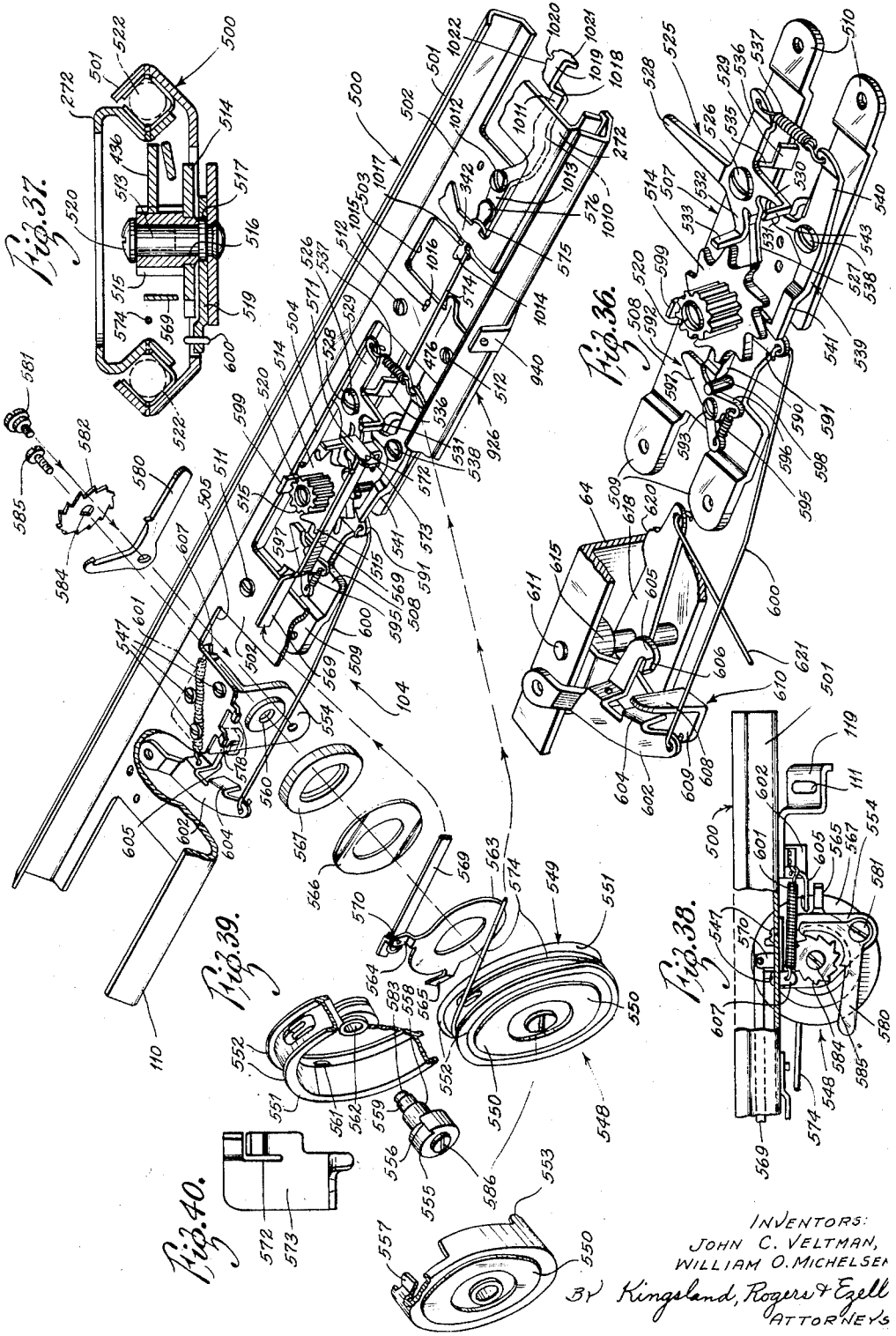

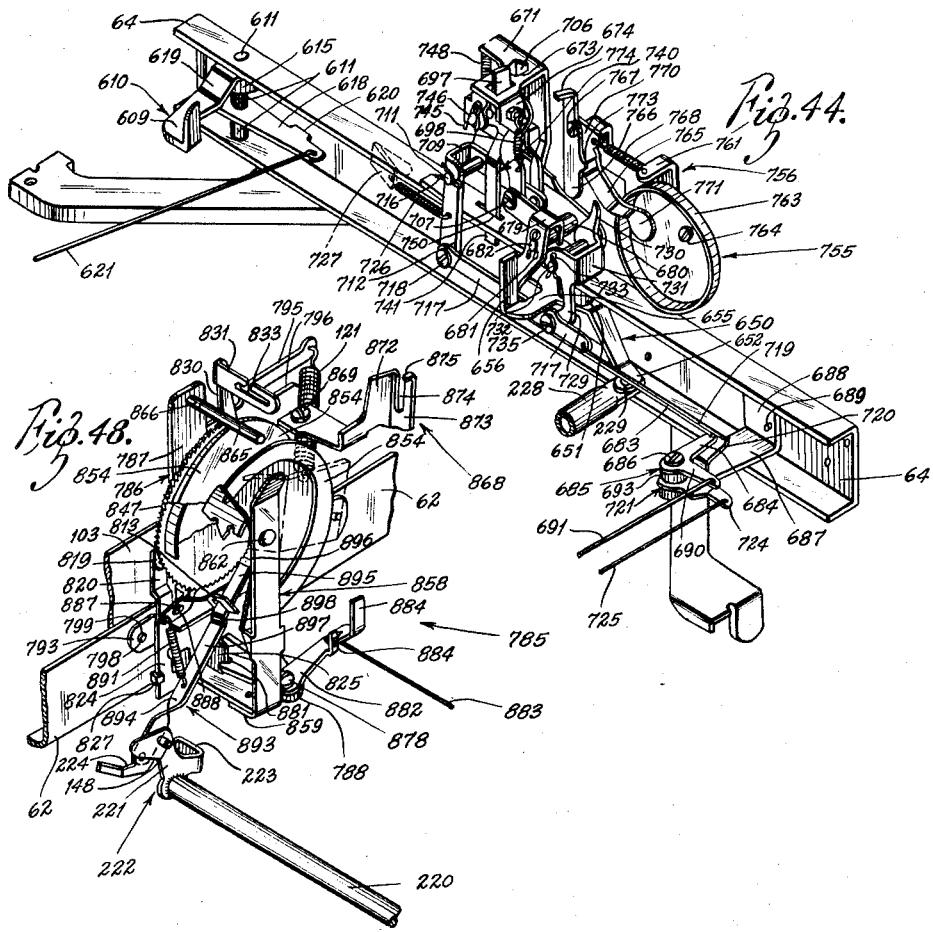
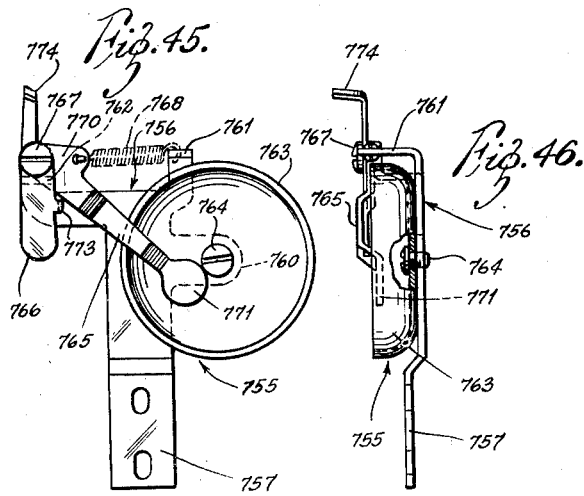

June 5, 1951  J. C. VELTMAN ET AL  2,555,521
TYPE ACTION FOR TYPEWRITING MACHINES
Filed Nov. 18, 1946  14 Sheets-Sheet 11

INVENTORS:
JOHN C. VELTMAN,
WILLIAM O. MICHELSEN,
BY Kingsland, Rogers & Ezell
ATTORNEYS.

June 5, 1951  J. C. VELTMAN ET AL  2,555,521
TYPE ACTION FOR TYPEWRITING MACHINES
Filed Nov. 18, 1946  14 Sheets-Sheet 12

INVENTORS:
JOHN C. VELTMAN,
WILLIAM O. MICHELSEN,
BY Kingsland, Rogers & Ezell
ATTORNEYS.

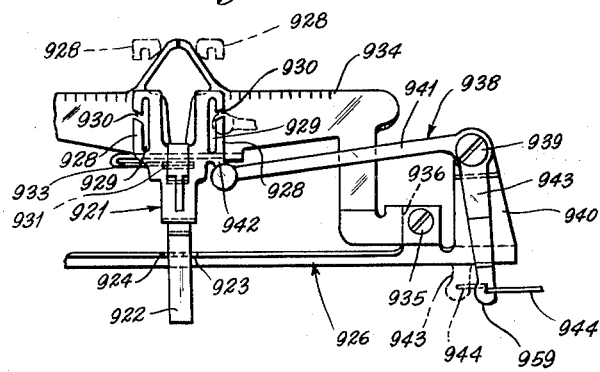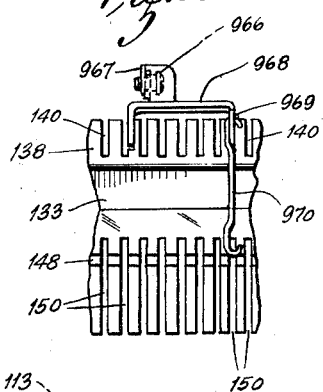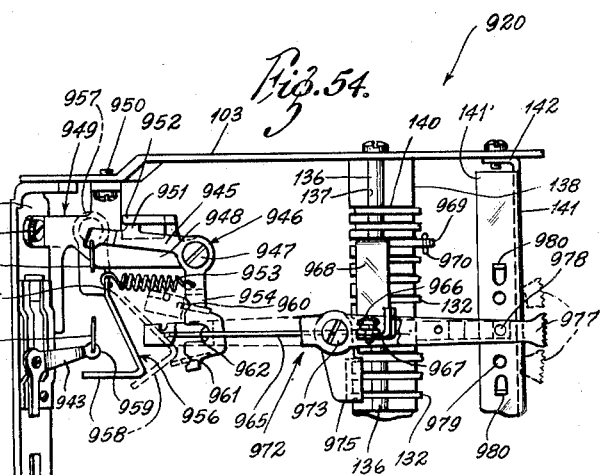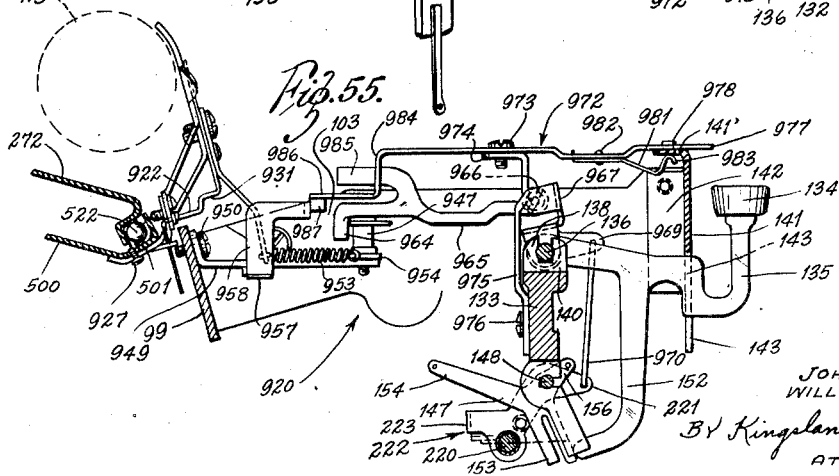

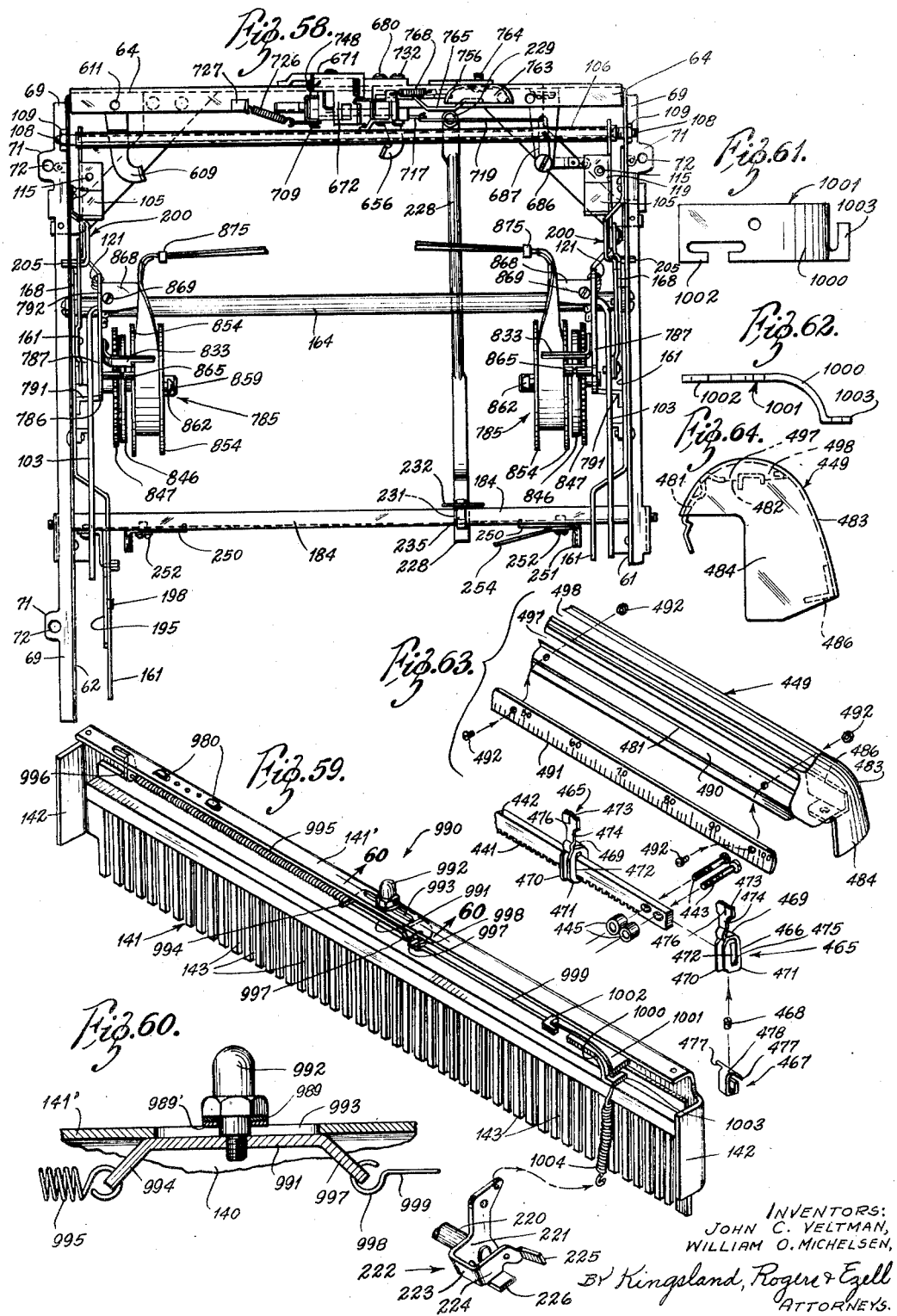

Patented June 5, 1951

2,555,521

UNITED STATES PATENT OFFICE 2,555,521

TYPE ACTION FOR TYPEWRITING MACHINES

John C. Veltman, St. Louis County, Mo., and William O. Michelsen, Poughkeepsie, N. Y., assignors to The Emerson Electric Manufacturing Company, St. Louis, Mo., a corporation of Missouri Application November 18, 1946, Serial No. 710,696

9 Claims. (Cl. 197—27)

The present invention relates to typewriters, exemplified in the present application by a portable typewriter.

An object of the present invention is to provide a novel typewriter in which the shift action involves movement of both the segment and type bar assembly and the platen carriage assembly in respect to each other, and which incorporates numerous novel features related thereto or functioning in connection therewith.

Another object is to provide a novel typewriter which is constructed of substantially fewer parts than typewriters of comparable size now and heretofore made include, thereby attaining a construction which may be made relatively inexpensively, which involves lower maintenance in that fewer parts are present to get out of functioning order, and which simplifies original fabrication thereof and repair after use.

Another object is to provide a novel portable typewriter which is sturdily constructed and which will perform in the manner of standard typewriters.

Another object is to provide a novel typewriter which incorporates an improved type action of a minimum number of parts which is positive in operation and yet which is formed without linking connections between key levers and associated intermediate levers, thereby facilitating assembly and disassembly of these several parts.

Another object is to provide a novel typewriter incorporating a type action which may be employed at high printing speeds without interference of the several working parts.

Another object is to provide a novel typewriter which incorporates a relationship between the type action and the escapement mechanism whereby the two movement phases of the platen carriage accomplishing one character space movement occur just before and just after a type bar strikes the platen in both lower and upper case printing so that interference between type bars is avoided in even high speed printing.

Another object is to provide a novel typewriter in which the escapement mechanism is actuated by the universal bar at substantially the same relative position of a type bar for both upper case and lower case printing.

Another object is to provide a novel typewriter in which there is no relative displacement between the key levers and the type bars when the typewriter is shifted from lower case to upper case position, or vice versa.

Another object is to provide a novel typewriter which incorporates a novel ribbon spool construction which positively and effectively feeds the ribbon in step by step action and which automatically reverses when the ribbon is fully fed out.

Another object is to provide a novel typewriter incorporating novel transversely movable margin and tabulator stops together with novel margin and tabulator mechanisms associated therewith assembled as a single unit for mounting on a typewriter frame.

Another object is to provide a novel typewriter of portable size having a platen of a size to receive a standard letter size sheet sideways, and yet which is so compact that the over-all width of the typewriter is within standard portable size.

Another object is to provide a novel typewriter incorporating novel fractional line space mechanism whereby the platen may be readily released for free rotation in respect to the line space lever and its associated ratchet wheel or maintained positively connected to the associated line space ratchet wheel.

Another object is to provide a novel typewriter incorporating novel spacer bar mechanism which yields at its limits of movement to absorb shock and to reduce noise.

Another object is to provide a novel typewriter including novel adjustable vibrator mechanism whereby a ribbon may be moved through a relatively long vertical distance in one setting of the vibrator mechanism and through a relatively short distance in another setting thereof.

Another object is to provide a novel typewriter having a novel touch control construction including a continuous wire and spring member effective at all times on the universal bar.

Another object is to provide a novel typewriter incorporating a novel paper table whereby paper fed beneath the platen and to the rear thereof is supported and which includes longitudinal openings looking to the tabulator and margin stops and through which the finger pieces of the margin and tabulator stops extend for manipulation.

Another object is to provide a novel typewriter in which the universal bar is strongly urged towards rest position immediately following reaching its position of extreme movement whereby the over-all writing speed of the typewriter is increased.

Another object is to provide a novel typewriter incorporating a minimum number of parts in the type action and in which the type action elements are so related in rest position that rebound of the type bars is positively prevented so that no interference obtains between adjacent type bars.

Another object is to provide a novel typewriter in which the type action includes intermediate bell crank levers mounted on a straight pivot line, each of which levers contacts the universal bar, and in which intermediate levers mounted on the same pivot line are provided for the margin, the taubulator and the backspace linkages, yet are free from contact with the universal bar.

Another object is to provide a novel typewriter incorporating a novel center lock mechanism of simple yet positive construction for locking the transversely movable carriage in center relation in respect to the stationary elements of the machine.

Another object is to provide a novel typewriter including improved simplified bell mechanism for warning a typist as the end of a writing line is approached.

Another object is to provide a novel typewriter having novel line lock mechanism of simplified form.

Another object is to provide a novel typewriter including improved carriage center stop mechanism.

Another object is to provide a novel typewriter incorporating a mask base of one-piece construction in which the working parts of the typewriter are supported when the main base is removed.

Another object is to provide a novel twpewriter including novel construction for preventing overthrow of the platen when the platen is quickly and vigorously rotated a predetermined number of line spaces through the use of the line space lever.

Other objects are to provide a novel typewriter which is constructed as subunits and assembled to provide the whole machine, which is formed to adapt itself to portable size yet which may be constructed of standard size, which is sturdy in construction, which incorporates ease of operation thereby minimizing operator fatigue, which is relatively inexpensive to fabricate and which requires a minimum of maintenance and repair work, and which may be efficiently employed by an operator in respect to all of its features with a minimum of instruction.

The foregoing and other objects and advantages are apparent from the following description taken with the accompanying drawings, in which:

Fig. 1 (Sheet 1) is an isometric view of a typewriter incorporating the teachings of the present invention, portions of the mask base and mask cover being broken away to show support and connection details;

Fig. 2 (Sheet 1) is a fragmentary vertical cross-sectional view illustrating the details of the connection of the mask, base plate and rest strip with the frame of the typewriter;

Fig. 3 (Sheet 1) is a fragmentary transverse vertical cross-sectional view illustrating the connection between the mask base and mask cover;

Fig. 4 (Sheet 1) is a view similar to Fig. 3, but taken at right angles thereto;

Fig. 5 (Sheet 1) is a fragmentary bottom plan view of a portion of the mask cover, illustrating one of the anchor tabs;

Fig. 6 (Sheet 2) is a skeletonized isometric view of the present typewriter with the mask and certain other elements removed, particularly illustrating the type action;

Fig. 6a (Sheet 2) is a plan view of a key;

Fig. 6b (Sheet 2) is a vertical cross-sectional view taken on the line 6b—6b of Fig. 6a;

Fig. 6c (Sheet 2) is a vertical cross-sectional view on the line 6c—6c of Fig. 6a.

Fig. 7 (Sheet 3) is a skeletonized isometric view similar to Fig. 6 with additional elements removed to illustrate features of the present typewriter construction;

Fig. 8 (Sheet 4) is a side elevational view of elements of the shift mechanism for shifting the paper carriage assembly and the segment and type bar assembly, the upper and lower case lock also being illustrated;

Fig. 9 (Sheet 4) is a view similar to Fig. 8 in which parts are shown in association with cooperating parts of the printing mechanism;

Fig. 10 (Sheet 4) is a side elevational view illustrating details of the type action;

Fig. 10a (Sheet 4) is an enlarged front elevational view of the hanger element supporting the free end of the push link;

Fig. 11 (Sheet 4) is a detailed view of the bell crank lever and stop associated with each end of the universal bar, the type action elements being omitted;

Fig. 12 (Sheet 4) is an enlarged fragmentary side elevational view illustrating the relationship of certain elements of the shift mechanism;

Fig. 13 (Sheet 4) is an enlarged fragmentary bottom plan view further illustrating the relationship of the elements of the shift mechanism shown in Fig. 12;

Fig. 14 (Sheet 5) is a top plan view of the paper carriage assembly with parts including the platen and paper pan removed to clearly illustrate details of construction;

Fig. 15 (Sheet 5) is a front elevational view of the paper carriage assembly;

Fig. 16 (Sheet 5) is an enlarged vertical sectional view taken on the line 16—16 of Fig. 14;

Fig. 17 (Sheet 5) is an enlarged vertical sectional view taken on the line 17—17 of Fig. 14;

Fig. 18 (Sheet 5) is an enlarged vertical cross-sectional view taken through the left end of the platen to illustrate details of the locking and release mechanism thereof;

Fig. 19 (Sheet 1) is an end view of that portion of the paper carriage assembly included in Fig. 14 looking towards the line space lever;

Fig. 20 (Sheet 1) is an end elevational view of the portion of the carriage assembly illustrated in Fig. 14 taken from the opposite end to Fig. 19;

Fig. 21 (Sheet 1) is a vertical sectional view on the line 21—21 of Fig. 15;

Fig. 22 (Sheet 1) is a vertical sectional view taken on the line 22—22 of Fig. 15;

Fig. 23 (Sheet 3) is a top plan view of the resilient support of the paper pan assembly;

Fig. 24 (Sheet 3) is a cross-sectional view taken on the line 24—24 of Fig. 23;

Fig. 25 (Sheet 3) is a fragmentary isometric view illustrating the connection of one side member of the frame with the rear channel member;

Fig. 26 (Sheet 3) is an enlarged vertical sectional view taken on the line 26—26 of Fig. 15;

Fig. 27 (Sheet 6) is an enlarged vertical sectional view taken on the line 27—27 of Fig. 15;

Fig. 28 (Sheet 6) is an enlarged end view of the paper pan and the resilient support therefor;

Fig. 29 (Sheet 6) is a bottom plan view of the elements illustrated in Fig. 28;

Fig. 30 (Sheet 6) is an exploded isometric view of the right end of the paper carriage assembly, the paper carriage assembly being omitted;

Fig. 31 (Sheet 7) is an exploded isometric view of the left end of the paper carriage assembly;

Fig. 32 (Sheet 8) is a top plan view of the lower rail assembly including the spring motor and the escapement mechanism;

Fig. 33 (Sheet 8) is a bottom plan view of the assembly illustrated in Fig. 32;

Fig. 34 (Sheet 8) is a top plan view of the escapement mechanism shown in the position assumed during the return movement of the paper carriage during which the escapement pawl is disengaged from the escapement wheel;

Fig. 35 (Sheet 8) is a top plan view of the carriage center lock mounted on the lower rail;

Fig. 36 (Sheet 9) is an enlarged isometric view of the escapement assembly and the related parts of the backspace device;

Fig. 37 (Sheet 9) is an enlarged cross-sectional view on the line 37—37 of Fig. 32, the platen carriage rail being added to show its relationship with the lower rail assembly.

Fig. 38 (Sheet 9) is a side elevational view of the spring motor barrel and associated parts, portions of the lower rail assembly being broken away;

Fig. 39 (Sheet 9) is an isometric view of the lower rail and escapement assembly with the spring motor assembly exploded to show the relationship and the structure of the parts thereof;

Fig. 40 (Sheet 9) is an elevational view of a bracket serving as the free end support of a link bar connected to a friction disc associated with the spring motor assembly;

Fig. 41 (Sheet 8) is a cross-sectional view through the paper carriage assembly and the slidable margin and tabulator stops;

Fig. 42 (Sheet 8) is a front elevational view of elements of the margin and tabulator constructions;

Fig. 43 (Sheet 8) is an end elevational view of the elements shown in Fig. 42;

Fig. 44 (Sheet 10) is an isometric view of the margin, tabulator and bell assembly mounted on the rear frame member of the typewriter, a portion of the backspace actuator also being disclosed;

Fig. 45 (Sheet 10) is a front elevational view of the bell and striker;

Fig. 46 (Sheet 10) is an end elevational view of the elements shown in Fig. 45;

Fig. 48 (Sheet 10) is an isometric view of the left hand ribbon spool mount together with associated operating parts including the left end of the universal bar;

Fig. 52 (Sheet 2) is a fragmentary plan view illustrating details of the spacer bar mechanism;

Fig. 53 (Sheet 2) is a vertical sectional view on the line 53—53 of Fig. 52;

Fig. 54 (Sheet 13) is a plan view of the ribbon setting and actuating mechanism showing the mechanism in relation to associated parts of the typewriter;

Fig. 55 (Sheet 13) is a side elevational view of the mechanism of Fig. 54, additional details of the typewriter being shown in vertical cross section;

Fig. 56 (Sheet 13) is an enlarged fragmentary front elevational view showing details of the vibrator actuator;

Fig. 57 (Sheet 13) is a front elevational view of the ribbon vibrator and its actuating bell crank;

Fig. 58 (Sheet 14) is a top plan view of the skeleton frame of the typewriter illustrating in connection therewith details of the shift mechanism and margin and tabulator mechanisms, and further showing the relationship and details of the ribbon spool assemblies;

Fig. 59 (Sheet 14) is an isometric view of the comb showing the touch control mechanism mounted thereon;

Fig. 60 (Sheet 14) is an enlarged vertical cross-sectional view on the line 60—60 of Fig. 59;

Fig. 61 (Sheet 14) is an enlarged top plan view of a bracket forming a part of the touch control mechanism;

Fig. 62 (Sheet 14) is an enlarged side elevational view of the bracket shown in Fig. 61;

Fig. 63 (Sheet 14) is an exploded isometric view of the right hand portion of the paper table and associated elements; and Fig. 64 (Sheet 14) is an end view of the paper table.

Figure 47:
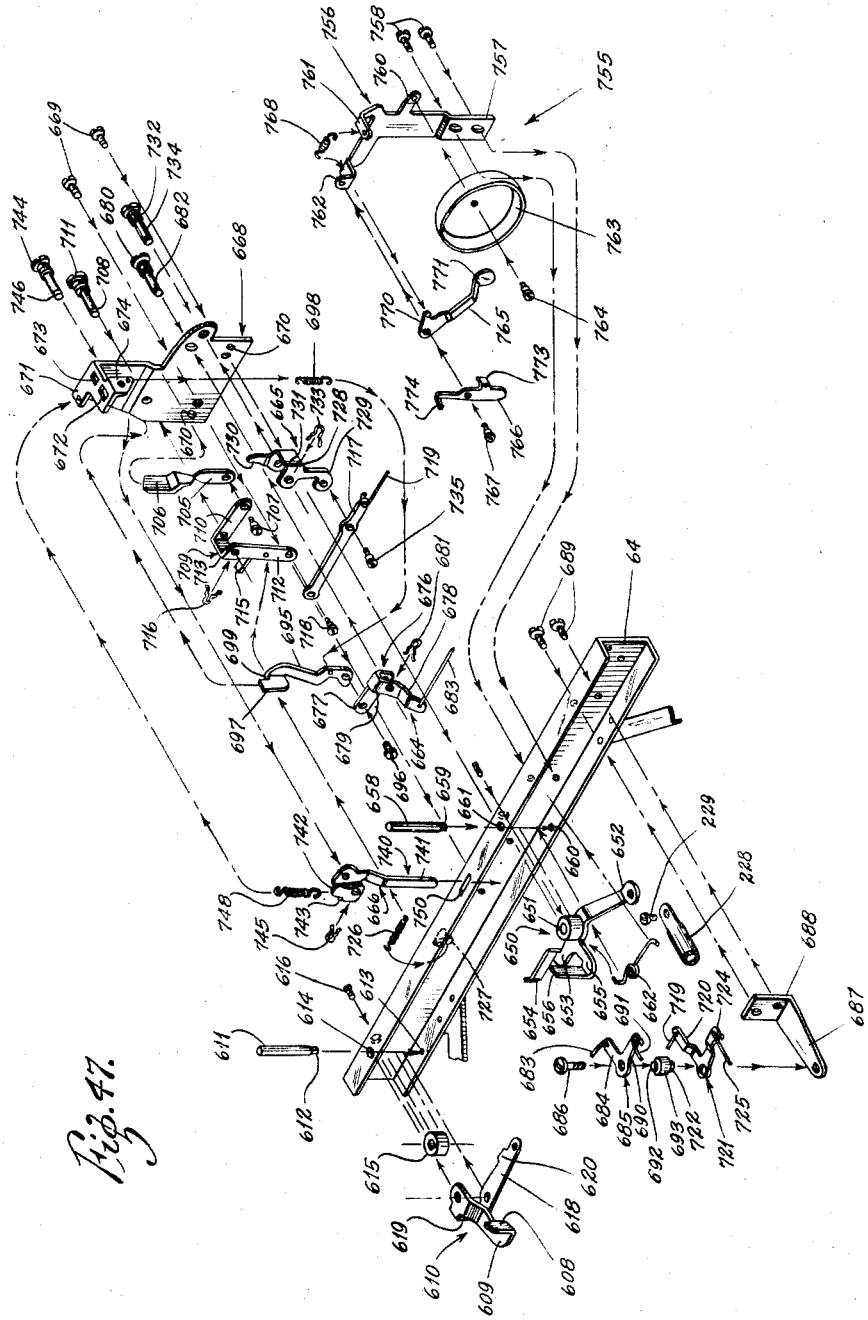
Fig. 47 (Sheet 11) is an exploded view of the elements shown assembled in Fig. 44.

Referring to the drawings more particularly by reference numerals, 60 indicates generally a typewriter constructed in accordance with the teachings of the present invention, which is shown in assembled operative relation in Fig. 1, and which is referred to herein as a typewriter or a machine.

The typewriter 60 includes side frame members 61 and 62 (Figs. 6, 7, 25 and 58), each of which includes an integral right angular flange 63 at one end thereof to which is secured a channel member 64 by welds 65 or the like (Fig. 25). The side members 61 and 62 and the channel member 64 form the frame which supports the elements and assemblies forming the typewriter 60. This frame may be formed as one piece if desired. Each of the side members 61 and 62 includes an outwardly turned longitudinal reenforcing flange 69 having spaced ears 71 with apertures 72 therethrough. Extending downwardly from each flange 69 is a pair of spaced legs 73 having inwardly turned feet 74 with a threaded aperture 75 therethrough.

The four feet 74 are mounted on a base plate 77 and are secured thereto by suitable screws 78 (Fig. 2). The base plate 77 includes a peripheral flange 79, of the cross section shown in Fig. 2, which receives a peripheral rest strip 80 which supports the typewriter 60. The rest strip 80 is preferably of rubber or some similar material assuring firm seating of the typewriter 60 on a supporting surface when in use, and has a continuous slit of the cross section of that of flange 79 to receive the flange 79. For further details of the base plate 77 and the rest strip 80, attention is directed to our copending application, Serial No. 646,846, filed February 11, 1946, which disclosure is incorporated herein by reference. The threaded apertures 75 and the corresponding apertures in the plate 77 are shown in the present application as in the planes of the metal in which formed; whereas, in our aforesaid copending application, both sets of apertures are formed as the apices of bosses. Either fastening form may be employed.

A mask base 82 having a keyboard opening 83 extends around the typewriter 60 and is preferably formed as a metal casting or die casting. A mask cover 84 is mounted on the mask base 82, as is shown in Fig. 1, and conceals the major portion of the type action. One convenient form of removably anchoring the cover 84 on the mask base 82 includes brackets 85 mounted on the mask base 82 having integral ears 86 which extend through apertures formed at the rear of the cover 84 (Figs. 1, 3, 4 and 5). Brackets 87 are secured to the cover 84 forwardly thereof and have integral anchor tabs 88 which are received in wells 89 formed in the mask base 82 and are maintained against accidental removal by springs 90. The esthetic effect of the mask base 82 and the mask cover 84 as applied to the other visible elements of the typewriter 60 is shown and claimed in our copending design application, Serial No. D. 133,528, filed September 23, 1946, (now Patent No. D. 150,041, June 22, 1948). The mask base 82 includes four interiorly located enlargements 92 having threaded apertures. A suitable screw 93, or the like, extends through the apertures 72 of the ears 71 and into the threaded apertures of the enlargements 92 to secure the mask base 82 to the side members 61 and 62.

The present typewriter 60 is of what may be termed a double shift type inasmuch as the segment and the type bar assembly and the platen carriage assembly shift toward each other in case shifting action. This feature of the present typewriter is disclosed and claimed in our copending application, Serial No. 612,772, filed August 27, 1945. A segment and type bar assembly 94 and a platen carriage assembly 95 are each pivotally mounted between said frame members 61 and 62, the former by pivot mountings shown as bolt assemblies 96 adjacent to the front of the machine 60, and the latter by pivot mountings 97 adjacent to the rear of the machine (Figs. 6 and 7), as is more fully described below.

The general structure of the segment and type bar assembly 94 is best shown in Figs. 6 and 7, and comprises a segment 98 supported on a transverse plate 99 which extends laterally to the side members 61 and 62 of the machine 60. The extremities of the plate 99 are bent to form right angle forwardly extending sections 100, each of which is preferably connected by welds 101 with a plate or arm 103 extending forwardly therefrom, which arms 103 pivot on the respective frame members 61 and 62 on the pivot bolt assemblies 96.

A lower rail assembly 104 (described in detail below, see Figs. 6, 32–39) of the platen carriage assembly 95 comprises bracket members 105, which are cross-connected by a rod 106. The rod is inserted through openings in the bracket members 105 at opposite ends, and the parts are joined together by brazing or welding. The rod 106 may be drilled and countersunk at opposite ends to form bearings for pivot screws 108, which are locked by nuts 109 in the side members 61 and 62 of the frame, and which screws 108, therefore, constitute the pivot mountings for said rod 106 and the bracket members 105 secured thereto.

A lower rail 110 extends transversely of the machine 60 and comprises a guide and support for an upper rail assembly 112 (described in detail below) that carries a platen 113, said upper rail assembly 112 being shiftable transversely thereon in the usual manner. This lower rail 110 rests upon and is secured to brackets 114 positioned adjacent to each end of said rail. The brackets 114, in turn, are releasably and adjustably secured to a top wall of the respective bracket members 105, preferably by screws 115 that pass through elongated slots 111 in angular extensions 119 of the brackets 114, which screws 115 thread into openings in said top wall of each of the brackets 105, as is best illustrated in Fig. 7. Since therethrough the lower rail assembly 104, which supports the shiftable platen carrying upper rail assembly 112, is rigid with said brackets 105, which, in turn, are pivotally mounted on the pivot screws 108, the entire platen carriage assembly 95 is supported for rocking movement in respect to the frame of the machine 60. As is later explained, the rocking movement of the platen carriage assembly 95 from its normal position of rest is in an arcuate direction opposite from the movement of the segment and type bar assembly 94 in shifting to and from the upper and lower case printing positions.

The platen carriage assembly 95 and the segment and type bar assembly 94 are pivotally interconnected at each side by rocker arms 116 (Figs. 6, 8 and 9). The arms 116 are connected with the respective bracket members 105 at their rear extremities by screw and slot connections 117, and at their front extremities are connected by screw and slot connections 118 with the arms 103, which, as above stated, pivotally support the segment and type bar assembly 94. The arms 116 constitute rocking arms or levers, having a pivot connection intermediate their extremities with the respective side members 61 and 62 of the frame. A pivot screw 116' passing through the respective frame member and through each of said arms 116 serves to permit the relative rocking movement of said arms 116 in respect of the frame, and thereby a rocking counterbalanced connection between the segment and type bar assembly 94 and the platen carriage assembly 95.

In order to provide for proper alignment and adjustment between the right and left hand rocking connection between these two assemblies to compensate for any misalignment or distortion in either of them, it is preferable to form one of said arms 116 in two sections, as illustrated, and to join said sections by a dowel, slot and screw connection 120 arranged so that a slight angular adjustment between the two sections of the arm may be made (Fig. 6).

The segment and type bar assembly 94 is normally held in raised position by a pair of springs 121 (Figs. 6 and 48), the upper ends of which are adjustably supported by elements of the ribbon spool assemblies, which are described in detail below, and the lower ends are connected, respectively, with the rear portions of the arms 103. These springs 121 serve to resiliently hold said arms 103 in such angular position that the forward ends of the rocker arms 116 are raised, thereby tilting the platen carriage assembly 95 forwardly and downwardly, and the segment and type bar assembly 94 backwardly and upwardly.

In order to limit the extent of the relative up and down movements of the segment and type bar assembly 94, and the platen carriage assembly 95, shift motion stops are provided which, as illustrated, include a pair of parallel spaced arms 122 secured to the segment plate 99 adjacent to each end thereof, which cooperate with arms 123 formed conveniently as integral extensions of brackets 114 which extend through openings 124 in the plate 99 and between said arms 122 (Figs. 6 and 7). The arms 123 are formed of material which may be slightly flexed so that said arms may be adjusted by bending to adjust the limit of the shift movement either up or down, whereby the relative movement of the segment and type bar assembly 94 and of the platen carriage assembly 95 will be brought to rest for proper alignment of the printing line of the platen for either upper or lower case printing.

A series of type bars 125, each carrying a type block 126, is pivotally mounted in and supported by the segment 98. The type bars 125 take the form of bell crank levers and are preferably pivotally supported on a wire 127 seated in a slot 128 formed in the periphery of the segment 98. Each type bar 125 includes an apertured extension 129.

It will be understood that the usual number of from forty-two to forty-six type bars 125 are included in the machine 60 in order to provide for the usual complement of printing characters arranged on the faces of the type blocks 126 in upper and lower case arrangement.

The segment 98 is provided with the usual spacing walls 130 forming slots that receive and guide the individual type bars 125. In the drawings, only sufficient of the type bars 125 have been illustrated to disclose the arrangement thereof in relation to the other elements and assemblies of the machine 60. A type bar guide 131 is secured to the segment 98 by screws 139 and extends upwardly therefrom.

Key levers 132 of the configuration shown are provided for operating the type bars 125 and are supported by a key lever bracket 133, preferably formed as an extrusion of the cross section shown, which is supported transversely of the machine 60, and is rigidly connected at its extremities to the inner faces of the arms 103 constituting the side members of the frame of the segment and type bar assembly 94 as aforesaid, whereby the type bars 125 and their operating means move as a unit in shifting movements. Each key lever 132 has a substantially elliptical character finger piece or key 134 on the free end of a vertically extending portion 135. Each key 134 has a dished finger surface, the major axis edges being concave (Figs. 6a, 6b and 6c). The inner ends of the key levers 132 are pivoted on a rod 136 passing through openings in the levers 132 and seated in a channel or groove 137 formed in an enlarged upper portion 138 of the bracket 133. The portion 138 has spaced vertical slots 140 which receive and space the key levers 132. A comb 141 is positioned forwardly of the bracket 133, and is also supported at its flanged extremities 142 by the plates or arms 103. This comb 141 has a series of vertical slots 143 extending upwardly from its bottom edge through which the key levers 132 extend and are guided. A metal strip 144 of the cross section shown in Fig. 8 is welded or otherwise secured to the inner face of the comb 141 above the slots 143 and extends thereacross. A cork strip 145, or the like, is retained by the strip 144 which serves as a resilient stop for the key levers 132.

A series of intermediate bell crank levers 147 is carried by and pivoted upon a rod 148 supported in a channel 149 in the lower portion of the key lever bracket 133. A series of spaced slots 150 extend upwardly from the bottom of said bracket 133 forming guides for said levers 147.

Each of the key levers 132 is formed with an angular arm 152 that extends downwardly and rearwardly, the tip of which projects into the respective slot 150 in the plane thereof and contacts a split depending arm 153 of its respective cooperative intermediate bell crank lever 147 pivotally mounted therein.

A rear arm 154 of each of the intermediate bell crank levers 147 is connected with its complementary type bar 125 by a wire link 155 which engages in the aperture of the extension 129 thereof.

The type bars 125, the key levers 132, and the bell crank levers 147 are held in position of rest by tension springs 157 attached at one end to a forward arm 156 of each of said intermediate bell crank levers 147, and at the other end to a bracket 158 attached to the front face of said key lever bracket 133 and extending thereacross. The tension of the springs 157, acting through the depending arms 156 of levers 147 and the contacting angular arms 152 of the key levers 132, holds the key levers 132 against the cushion strip 145 supported as aforesaid on the inner face of the comb 141 above the slots formed therein, which strip cushions the rebound of the key levers 132. The key levers 132 are gravity urged into contact with the intermediate levers 147 at all times.

The pivotal connection of each wire link 155 with its respective intermediate bell crank lever 147 and type bar lever 125, and the pivot point of said bell crank lever 147 are disposed in a straight line, so that a toggle effect is provided that serves to lock each type bar 125 in its position of rest in respect to movement initiating with the type bar 125, and, hence, to prevent rebound of and interference between the type bars 125.

It is to be observed that the key levers 132 are disposed in four rows, the finger pieces 134 of the innermost row being at greatest elevation and those of the outer row at lowest elevation, in the usual manner. Manifestly, since all key levers 132 pivot on the straight rod 136, the key levers 132 of the innermost row are the shortest, and those of the outer row the longest. To accomplish substantially the same movement of all finger pieces 134 and of all type bars 125, the angular arms 152 of the innermost key levers 132 are longer than those of the other rows, those of the outer row being the shortest, those of the outer intermediate row being a little longer than those of the outer row, and those of the inner intermediate row being a little shorter than those of the innermost row and longer than those of the outer intermediate row. Hence, the tips of the angular arms 152 of the several rows of key levers 132 contact the depending arms 153 of the bell crank levers 147 at different distances from the pivot rod 148 of the latter.

Further, the rear arms 154 of the bell crank levers 147 increase in length from the center ones outwardly towards both sides of the machine 60, as do the links 155, since the levers 147 are pivoted on a straight line and the type bars 125 are pivoted on an arc.

A cushioned rest is provided for the type bars 125 in the form of an arcuate member 146 of channel cross section supporting a felt member 146' against which the type bars 125 fall and on which they rest (Figs. 6 and 10). A bracket 159 vertically adjustably secured to the bracket 133 by screws extending through vertically elongated apertures in the bracket 159 supports the member 146.

The mechanism for effecting the relative shift of the segment and type bar assembly 94 and the platen carriage assembly 95 includes shift key levers 160 and 161 of the configuration shown (Figs. 6 and 8), positioned, respectively, at the right and left of the key board. The rear ends of said levers are formed as right angular cross pieces including downward extensions or arms 162 and upward extensions 163 are pivotally mounted on the pivot screws 116' which pivotally support the arms 116, above described. The levers 160 and 161 are normally held in raised position by a pair of springs 162' and 163', attached, respectively, at one end to said levers 160 and 161, and at their opposite ends to a flange 141' extending horizontally from the top wall of the comb 141. The top edge of each of said levers also cushions against the extremities of the cushion strip 145, each lever 160 and 161 being guided in the outermost slots 143 of the comb 141.

The depression of either shift key lever 160 or 161 rocks the shift frame comprising said levers and the tie tube 164, and through operatively associated elements, lowers the front ends of the arms 116 and raises the rear ends thereof, thereby moving the segment and type bar assembly 94 downwardly, and raising the platen carriage assembly 95 to shift the printing line of the type on the platen 113.

The means whereby the movement of the shift key levers is translated to this rocking movement of the arms 116 includes a pair of cushion levers 166, one of which is cooperatively associated with each of the shift key levers 160 and 161. These cushion levers take the form best shown in Figs. 8, 9, 12 and 13, from which it will appear that each lever includes arms 167 and 168 forming a bell crank lever pivoted at 169 to the inner face of the upward extension 163 of each of the levers 160 and 161. Each of the cushion levers 166 has a third arm 170, the extremity of which is bent at an angle to form an ear 171 which overlies the top edge of its respective shift lever. The lower extremity of each of the arms 167 is connected to the downward extension 162 of its respective shift lever by a tension spring 172. The ears 171 which overlie the upper edges of their respective shift levers act as detents opposing the contraction force of the springs 172, which, upon downward movement of said shift levers are released the amount of pivotal movement thereof, and the springs 172 thereupon rock the arms 167 rearwardly or to the left, as illustrated in Fig. 8.

Each of the arms 116, which is in the plane of its associated cushion lever 166, rearward of its pivot has a depending arm 175. The lower extremity of each of said arms 175 is bent inwardly forming an ear 176 which includes a rearwardly and upwardly stop extension 177 for a purpose described below. When the cushion levers 166 are free to respond to the contraction of the springs 172 on depression of either shift key lever, the rear edges of the arms 168 impinge against the forward edges of the depending arms 175, causing the arm 116 to rock, thereby imparting the double shifting movement to the segment and type bar assembly 94 and the platen carriage assembly 95, as above described.

Since the two shift levers 160 and 161 are rigidly interconnected by the tube 164, it is only necessary to provide a shift lock associated with one of them. As illustrated, a shift lock 178 is associated with the shift key lever 161 and comprises a bell crank lever 179 pivoted on a screw 181 against the outer face of the lever 161. The lever 179 is formed with a shoulder or detent 182 near the lower extremity of one arm 180, which engages with a lug or bracket 183 attached to a channel transverse frame brace 184 having end flanges 185 secured by screws 186 to the front pair of legs 73 of the machine. The bracket 183 includes an attaching flange 187 having a vertical slot therein which receives a screw 188, thereby providing for vertical adjustment thereof. The attaching flange 187 also has a right angular tab 190 which extends into a vertical slot in the brace 184 thereby preventing turning of the bracket 183. A spring 192 secured to the lever 179 and to the shift lever 161 biases the former clockwise (Fig. 8). The other arm 193 of the bell crank lever 179 is engaged by a toe 196 of a shift lock key lever 195. The lever 195 includes a finger piece 197 and a flanged extension 198 which engages the lower edge of the shift lever 161. It is to be observed that the lever engageable portion of the bracket 183 is disposed at an angle so that it is substantially tangential to the pivot axis of the shift lever 161. Hence, the spring 192 normally keeps the detent or shoulder 182 disengaged from the bracket 183 both in at rest position of the elements and upon the normal depression of the shift key levers. The spring 192 also maintains the lock key lever 195 in the position of Fig. 8. To engage the detent 182 with the bracket 183, the lever 195 is depressed along with a shift lever 160 or 161, which pivots the lever 179. After the detent 182 is engaged by depressing the lock key lever 195, the spring 192 also serves to disengage the detent 182 and restore the elements to the rest position of Fig. 8 upon slight pressure on one of the shift key levers to move it and the shift lock 178 downwardly slightly beyond the normal depressed position, as is clear from the foregoing. This slight additional depression of a shift key lever 160 or 161 to release the detent 182 is possible without any strain on the parts because of the yielding connection between the rear extremity thereof and the arm of its associated cushion lever 166 as aforesaid.

It will be understood that when the shift mechanism is operated as described, the relative positions of the segment and type bar assembly 94 and platen carriage assembly 95 are reversed from the normal or at rest position. In normal position, the segment and type bar assembly 94 is in raised position and the platen carriage assembly 95 is tilted downwardly, as already explained. This is the lower case printing position. When the shift occurs, the segment and type bar assembly 94 moves downwardly and the platen carriage assembly 95 is raised, thus, by simultaneous movement of the two assemblies, each of which makes approximately one-half of the combined movement, the necessary spacing to align the upper case type to the printing line is accomplished. Since the movement of each of the assemblies is only approximately one-half of the combined movement to effect the shift, and, since the assemblies counterbalance each other, the inertia of the movement and the impact at the termination of the movement are substantially reduced.

The locking of the assemblies in shifted position, in order to properly align the type for upper case printing, is effected by the shift lock 178, as described. It is also preferable that the assemblies be locked in their normal position to prevent any disalignment of printing in the lower case, and this lower case lock must be coordinated with the shift mechanism, so that it may be automatically unlocked when the shift occurs.

The mechanism for effecting the locking of the assemblies 94 and 95 in the initial or lower case position includes a bell crank lever 200 (Figs. 8 and 9) associated with each of the rocker arms 116. Each bell crank lever 200 includes an arm 201, which extends forwardly and downwardly, and an arm 202 in the form as illustrated in Figs.

8 and 9 of the drawings. These levers 200 are pivoted on screws 204 threaded, respectively, into the inside face of each of the frame members 61 and 62. The forward extremity of each of the arms 201 is bent outwardly at an angle forming an ear 205, which ears extend into the planes of the stop extensions 177 of the ears 176 formed at the extremities of the arms 175 of the rocker arms 116. In lower case position of the assemblies 94 and 95, the arms 201 are normally held in the rest position as illustrated in Fig. 8, in which the ears 205 are in a position to be contacted by the stop extensions 177, and thereby prevent the rocking of the arms 116. With the ears 205 thus blocking pivotal movement of the arms 116, the machine 60 cannot be inadvertently shifted from its normal lower case position. The shift levers 160 and 161, through mechanism described below, automatically pivot the ears 205 from blocking position prior to shifting action. The means for maintaining the rest position of each of the arms 201 comprises a spring 207 (Fig. 9), one end of which is attached to a flange formed at the lower extremity of the arm 202, and the other end of which is connected to a downwardly turned flange of a corner reinforcing member 208 secured to the under side of the flange 69 of a side member 60 or 61 and to the lower flange of the channel member 64.

When the shifting mechanism is operated by depression of one of the shift levers 160 and 161, angular links 210 pivoted on screws 211 threaded into the downward extensions 162 of shift levers 160 and 161 are moved rearwardly. The links 210 assume the angle shape best illustrated in Fig. 8, and are supported and guided in their movements by screws 212 anchored to the side members 60 and 61, said screws 212 projecting into slots 213 in the upper extremities of vertical arms of the links 210. The upper rear edges of the links 210 are formed as cam faces 214, which cooperate with fingers 215 extending from the arm 202, which ride on the cam faces 214 in such relation that, when the links 210 are moved rearwardly upon depression of either of the shift key levers 160 or 161 through the linkage just described, the ears 205 of the arms 201 are moved downwardly against the tension of the springs 207, thereby releasing the stop extensions 177 of arms 175 so that the rocker arms 116 are free to rock upon continued movement of the shift key levers. This release of the levers 200 occurs on the initial depressive movement of the shift key levers and before the rear edges of the arms 168 of the cushion levers 169 contact the depending arms 175 to impart rocking movement to the rocker arms 116. This is because of the fact that there is a slight space as indicated at A (Fig. 8) between said levers 166 and the arms 175, thereby preventing contact therebetween until the levers 200 are moved downwardly sufficiently to clear the ears 205 from the stop extensions 177.

It is preferable that the fingers 215 be made sufficiently flexible in order to adjust their tip contact with the cam faces 214 to regulate the timing of the release of the lock, and so that, after it has been released, the tips of the fingers 215 will ride on the cam faces 214 during further depression of the shift key levers, thereby holding the levers 200 out of locking engagement during the period that the shift key lock 178 is operative to hold the assemblies for upper case printing.

The operation of the escapement mechanism, which is described per se in detail below, includes certain novel features to adapt it to the aforesaid shift features of the machine. A tubular universal bar 220 is supported transversely of the machine 60 in the rear of the split depending arms 153 of the intermediate levers 147. The universal bar 220 is supported at each extremity by an arm 221 of a bell crank lever 222, the two bell crank levers 222 being pivotally mounted through the arms 221 on the rod 148 that pivotally supports the intermediate bell crank levers 147. The levers 222 rock in slots 150 of the bracket 133 near the ends thereof. The universal bar 220 is spring biased towards rest or forwardly pivoted position by mechanisms described in detail below. In addition, a leaf spring 217 is provided formed integral with a base 218 secured to the bracket 133 behind the bracket 159 which is contacted by the universal bar 220 a short distance before it completes it rearward travel and which serves to give the universal bar 220 an initial return impetus to insure its rapid return to rest position (Fig. 10). Greater typing speed is thereby made possible.

The universal bar 220 is adjacent to the depending arms 153 of the levers 147, so that whenever any one of them is rocked upon depression of a key lever 132, the universal bar 220 will be rocked rearwardly thereby. In order to adjust the contact and timing of the contact with said universal bar 220, the rear legs of the split depending arms 153 of the levers 147 may be bent to adjust the angular relation of their rear edges to the universal bar 220.

The arm 221 of each bell crank lever 222 is formed to the configuration clearly shown in Fig. 7, including a returned portion 224 offset by a web 223 and terminating in an outwardly turned stop tab 225 which limits the forward pivotal movement of the universal bar 220 by contacting the end of the bracket 133. Also extending outwardly from each portion 224 is a flange 226 which functions to automatically reverse the direction of travel of the ribbon, as is more particularly described below.

An escapement trip push link 228 is pivotally connected at its rear end by a pivot shoulder screw 229 to an element of an escapement mechanism generally designated 230 (Fig. 7), and more particularly described below in conjunction with Figs. 32-40. The front end of the link 228 passes through a slot 231 formed in the cross brace 184, and is supported for free reciprocative movement out of contact with the defining edges of the slot 231 by a hanger element 232 suspended from a bracket 235 anchored to the cross brace 184 as shown. A plate 233 is secured to the top face of the push link 228 in any suitable manner, and an arm 234 formed integrally with said plate 233 extends upwardly at an angle and is located rearwardly of the universal bar 220 for contact thereby. The arm 234 is adjusted at such an angle that the contacting face thereof will remain parallel to the axis of the universal bar 220 in its upper and lower case positions and at substantially the same distance therefrom.

It will be apparent that upon each depression of a key lever 132, the universal bar 220 is rocked in a rearward arc contacting the arm 234, and thereby moving the escapement trip push link 228 rearwardly, whereby a step by step movement is imparted to the platen carriage, as is more fully set forth below. The angular position of the arm 234, as above explained, is of importance because the universal bar 220 moves with the segment and type bar assembly 94 as a unit and, therefore, whenever a shift is made, the point of contact of the universal bar 220 changes position vertically in respect of the arm 234, since the link 228 does not move during the shift. This change in relative position of the universal bar 220 and the arm 234 of the escapement push link 228 is compensated for by the adjustment of the angle of the arm 234. Therefore, irrespective of the relative position of the segment and type bar assembly 94 and the platen carriage assembly 95, the escapement mechanism 230 will be tripped at the same point in the movement of the type bars 125 in respect of the platen 113.

A spacing bar 237 is mounted at the front of the typewriter 60 in a space 238 provided in the mask base 82, being supported on a metal strip 239 and secured thereto by screws 240 (Figs. 6, 52 and 53). The metal strip 239 has downwardly turned terminal flanges 241 to each of which is secured one vertical portion 242 of an arm 243 (Fig. 6). A second vertical portion 244 of each arm 243 is secured as by welding to a transversely disposed rod 246 to each end of which is secured a link 247. The links 247 are pivotally mounted by screws 248 on upstanding portions 250 of brackets 251 which are secured by screws 252 and inturned tabs 253 to the frame brace 134. Leaf springs 254 are secured against the brackets 251 by the screws 252 and engage enlargements on the edges of the vertical portions 244 to maintain the spacing bar 237 in raised position and to return it thereto after use. One arm 243 has a lateral extension 255 at the rear thereof which engages the forward end of the escapement push link 228 on pivotal movement of the spacing bar 237. A stop member 256 is secured to the mask base by screws 257 and includes two offset oppositely extending arms 258 which are engaged by flanged tabs 259 extending downwardly from the strip 239 to limit pivotal movement of the spacing bar 237 effected by the springs 254, and which are engaged by the strip 239 to limit downward movement of the bar 237. A rubber cushion 260 may surround the contact end of each arm 258.

The shiftable platen carriage assembly 95 includes a transversely slidable platen carriage assembly 265 which carries the platen 113 mounted on a shaft 266 and secured thereto for rotation therewith by setscrews 267 (Figs. 14-24 and 26-31). The shaft 266 is journaled in bearings 268 and 269 supported by end plates 270 and 271, the end plates 270 and 271 being rigidly secured to an upper rail member 272 by rivets 273 at each end thereof and extending vertically upwardly therefrom.

The platen 113 may be manually rotated by knobs or wheels 275 and 276 mounted on the extremities of the platen shaft 266 and secured thereto by setscrews 277, or, alternatively, by a line spacing device which includes a ratchet wheel 278 secured to the hub of a shell 279 for rotation therewith, and a finger lever 280. The finger lever 280 has a flat portion or arm 281 by which it is pivotally mounted on an ear 282 extending outwardly from the top edge of the end plate 271 by a screw 283 extending therethrough and anchored by a nut 284. A wire wrap spring 285 surrounds a portion of the nut 284 and has one end anchored to a post 286 secured to the portion 281 and the other end disposed against the side of the end plate 271, thereby biasing the lever 280 clockwise at all times (Figs. 14 and 31). A pawl 287 having a pawl tooth 288 is pivotally mounted on the flat portion 281 by a shoulder screw 290. A leaf spring 291, formed as shown, is superposed on the pawl 287, being secured in place by said screw 290. An eccentric member 292 is locked between the pawl 287 and spring 291, and is adapted to strike a vertical inwardly directed flange or lug 294 formed integral with the end plate 271 to limit pivotal movement of the lever 280 counterclockwise. The eccentric member 292 affords an adjustment. The clockwise pivotal movement of the lever 280 is limited by the portion 281 thereof striking the outer end or shoulder of the flange 294 (Fig. 14).

A shield member 296 is pivotally mounted in a slot 297 in an enlarged portion of the bearing 269 and includes an ear 298 which receives the pawl tooth 288 in the rest position of the latter. The ear 298 carries numerals indicating the setting of the shield member 296 in respect to the number of lines the platen 113 will be rotated upon pivotal movement of the lever 280. The pawl tooth 288 slides rearwardly from the ear 298 and engages the teeth of the ratchet wheel 278. The shield member 296 includes a handle 299 and notches 300, three being shown. A bell crank detent 302 of the form shown in Fig. 31 is pivotally mounted on the inner face of the end plate 271 by screw 303 and includes one arm 304 formed to engage the notches 300 and a second arm 305 having an aperture receiving one end of a tension spring 306 biasing the arm 304 into engagement with the notches 300 (Fig. 21). An ear 301 formed integral with the shield member 296 limits forward pivotal movement thereof by contacting the end of the arm 304, rearward pivotal movement being limited by striking of the bottom edge of the shield member 296 against a pivotal mounting shoulder screw 309, more particularly referred to below. An ear 307 formed integral with the end plate 271 serves to prevent rotational overthrow of the platen 113, being located directly over, and being contacted by, the inclined portion of the pawl 287 in its rearmost operative position, thus holding the pawl tooth 288 thereof in engagement with the ratchet tooth selected on the ratchet wheel 278.

A detent 311 is provided for the ratchet wheel 278, and is pivotally mounted on a screw 312 threadedly anchored to the inner face of the end plate 271. A mounting portion 313 thereof abuts the inner face of the end plate 271 and an inwardly offset portion 314 pivotally supports a roller 315 on a stub shaft 316. The roller 315 engages the teeth of the ratchet wheel 278, being biased into firm engagement therewith by the spring 306, the other end of which is connected to the free end of the detent 311. An ear 317 extends from the lower edge of the portion 314 towards the end plate 271 and is engageable by a toe 319 of a detent release arm 320, of the form shown, which is pivotally mounted on the above-mentioned shoulder screw 309 which extends through the end plate 271 and receives a shoulder nut 310, a spring washer 318 maintaining the arm 320 frictionally operable, and functioning to prevent noise due to vibration. A mounting portion 321 of the arm 320 is adjacent the inner face of the end plate 271, whereas a finger portion 322 is located adjacent the outer face of the end plate 271, being offset from the portion 321 by an intermediate portion 323 which extends through a slot 324 in the end plate 271. It is clear that forward movement of the finger portion 322 rocks the toe 319 against the ear 317 pivoting the detent 311 downwardly and disengaging its roller 315 from the teeth of the ratchet wheel 278. The teeth of the ratchet wheel 278 are spaced to determine line or half line spacing for the platen 113, as may be desired.

A paper lock, release, and guide mechanism which is disclosed and claimed in our copending application, Serial No. 678,995, filed June 24, 1946 (now Patent No. 2,527,859, October 31, 1950), includes a paper pan assembly 327 having a paper pan in the form of an elongated curved plate 328 (Figs. 27-29), having a concave upper or inner face 329 and a convex lower or outer face 330. The plate 328 is carried by the upper rail member 272 of the slidable platen carriage assembly 265, and is mounted to underlie the platen 113. The radius of curvature of the plate 328 is such that, when in assembled relation with the platen 113, there will be slight space between the upper face 329 of the plate 328 and the periphery of the platen 113, as is indicated in Figs. 26 and 27 of the drawings. The rear marginal area of a rear wall 331 of the plate 328 is deflected rearwardly, and both the front and rear edges of the plate 328 are rounded, thereby avoiding any sharp surface from contacting with a sheet of paper inserted and positioned in the machine.

The plate 328 has an elongated narrow slot 333 in a front wall 332 thereof, which is centrally positioned in the median area thereof. A second elongated slot 334, wider than slot 333, is formed in the rear wall 331 of the plate 328. At each end of the slots 333 and 334 are concave depressed portions 335 and 336, respectively, formed from the metal of the plate 328. A pressure roller 338 is mounted in the front slot 333, and a pressure roller 340 is mounted in the rear slot 334. These pressure rollers 338 and 340 comprise cylinders formed of rubber or other similar material, through which metal shafts 339 and 341, respectively, extend, said shafts projecting beyond the ends of the rubber to form trunnions which seat in the depressed portions 335 and 336, respectively, in such a manner as to revolubly support the pressure rollers 338 and 340. The rollers 338 and 340 contact the platen 113 at the front and rear, respectively, of the lower segment of the platen at the positions best shown in Figs. 26 and 27 of the drawings.

The plate 328, with the pressure rollers 338 and 340, is resiliently supported on end web portions 342 of the upper rail member 272 of the slidable platen carriage assembly 265 in such a manner as to cause the rollers 338 and 340 to normally press resiliently against the platen 113.

The support for the plate 328 comprises a narrow elongated spring plate 343 (Figs. 23 and 24) having a central section 344 formed with a U-shaped channel 345 therein at the median line of the plate 343, and laterally extending arms 346, which arms 346 extend downwardly and terminate in transverse plates 347 on the outer edge of each of which is formed a downwardly projecting ear 348.

The central portion of the plate 343 has its top face welded or otherwise securely attached to the outer face of the plate 328 on a central line thereof so that, when the paper pan assembly is mounted in place, the ears 348 will seat in openings 349 formed in the upper rail member 272 in spaced relationship. The openings 349 are sufficient in diameter to permit slight longitudinal extension and retraction of the spring. This structure permits the plate 328 to be supported in assembled relation with the platen 113 in such a manner that it will be resiliently urged upwardly toward the platen 113, the movement being in substantial parallelism therewith and, likewise, to be depressed with a similar movement. The upward movement of the paper pan assembly 327 moves the pressure rollers 338 and 340 toward engagement with the platen 113, frictionally locking an inserted sheet of paper therebetween. When the paper pan assembly 327 is moved downwardly against the tendency of the supporting spring plate 343, the rollers 338 and 340 move out of contact with the periphery of the platen 113, which is a released position, permitting free movement of an inserted paper sheet.

In adjusting an inserted paper sheet, and during the movement of the paper pan assembly 327 either upwardly or downwardly, the transverse plates 347 ride on the top faces of the end web portions 342 of the upper rail member 272 and serve as guides to assure that the movement will be in a true vertical path, thereby maintaining the parallelism of the paper pan assembly 327 with the platen 113. This action provides for uniform clearance between the pressure rollers 338 and 340 and the platen 113 throughout their length.

The mechanism for moving the paper pan assembly 327 from locking position to permit free movement of an inserted paper sheet during the adjustment of the same for printing operations or to locked position for frictionally engaging the sheet of paper in feeding operation is extremely simple in construction but highly efficient in operation. The actuating mechanism for this purpose comprises a bell crank lever 351 which is pivoted upon and is carried by a shoulder screw 352 threaded into the inner face of the end plate 270 (Figs. 15-17, 22 and 30). The bell crank lever 351 has a finger flange 353 integrally formed with and extending laterally from an upper arm 354, said arm projecting upwardly and inclining forwardly near the rear right corner of the slidable carriage assembly 265, so that it is positioned for convenient manual manipulation by an operator in effecting the adjustment of the paper lock and release mechanism. A shaft 356 is pivotally mounted in the rear of the paper pan assembly 327 (Fig. 14) and extends inwardly from the right end plate 270 to a point a little past the center of the upper rail member 272 and the paper pan assembly 327. At the outer end of the shaft 356 is a reduced extension 357 pivotally supported in a bearing aperture 358 (Fig. 30) formed in the end plate 270, and at the inner end thereof is a reduced extension 359 pivotally supported by a bracket 360 secured to the top face of the central web 342 of the top rail member 272 by screws 361 (Figs. 14 and 16). Near the inner end of the shaft 356 is an arm 363, which has formed integrally therewith an extension 364 of arcuate form adapted to be disposed concentric with the platen 113 that projects into the channel 345 formed in the central portion 344 of the spring plate 343 (Fig. 27). There is a small amount of play between the surfaces of the extension 364 and its seat in the channel 345 to insure that spring pressure of the spring plate 343 supporting the plate 328 will be unrestrained from the train of release members. A wrap wire spring 365 surrounds the shaft 356 between the arm 363 and the bracket 360, one end thereof resting against the web portion 342 and the other end engaging the under edge of the arm 363, thereby biasing the arm 363 towards the platen 113 (Fig. 17).

On the outer extremity of the shaft 356, and rigidly secured thereto, is an arm 367, the end of which comprises a cam follower 368 and the lower edge a detent or stop 369 (Fig. 30). The extremity of a lower arm 370 of the bell crank lever 351 is curved to form a cam surface 371. Thus, when the finger flange 353 is depressed, the cam surface 371 of the extremity of the lower arm 370 of the bell crank 351 will cam against the cam follower 368 of the arm 367, thereby rocking the shaft 356 to the limit of the rocking movement thereof, which occurs when said bell crank lever arm 370 engages against the detent 369. When the finger flange 353 is moved upwardly, the shaft 356 rocks in the reverse direction. The wrap spring 365 coiled on the shaft 356 serves to urge the arm 363 upwardly and thereby hold the associated parts in locked position, avoiding vibration thereof during operation of the typewriter 60. The upward or rearward movement of said finger flange 353 is limited by an inwardly directed flange or lug 372, formed integral with the end plate 270 and disposed in a position so that the upper arm 354 of the bell crank lever 351 will contact therewith before the cam surface 371 of the lower arm 370 rides off the end of the arm 367 (Fig. 22).

The actuating mechanism for raising and lowering the paper pan assembly 327 just described forms, in effect, a bail for translating rocking movement of the shaft 356 into a vertical movement of the paper pan assembly 327, the movement, as hereinbefore described, being accurately controlled to preserve a substantial parallelism between the pressure rollers 338 and 340 and the platen 113. Thus, when the finger flange 353 is manually moved forwardly by an operator, the shaft 356 will be rocked counterclockwise, as viewed in Fig. 30, and, by the mechanism described, will thereby draw the spring plate 343 downwardly to clear the pressure rollers 338 and 340 from the platen 113. In this adjustment position, an inserted sheet of paper is free to be manipulated into proper adjustment, after which the finger flange 353 may be snapped rearwardly, causing engagement of the pressure rollers 338 and 340 against the sheet of paper and holding it in frictional engagement with the platen 113.

The fact that the force for raising and lowering the paper pan assembly 327 is applied at a central point longitudinally thereof and the spring pressure is applied and released at the approximate center of the length of the spring plate 343 prevents tilting of the paper pan assembly 327. Furthermore, since the extremities of the spring plate 343 are accurately located in the web portions 342 of the upper rail member 272, as is hereinbefore described, a transverse tilting of the paper pan assembly 327 during the adjustments thereof is prevented.

The paper feed mechanism also includes a bail 374 whereby sheets of paper may be centered and may be curved rearwardly against the platen 113. The bail 374 comprises a graduated bail rod 375 upon which is mounted spaced slidable and rotatable rollers 376 of conventional design. The bail rod 375 is supported at its ends by right and left arms 377 and 378, respectively (Figs. 30 and 31). The lower ends of said arms 377 and 378 are pivotally connected to the end plates 270 and 271 by shoulder screws 379 and 380, respectively, threaded into said end plates and forming the pivot mountings for said arms. The upper ends of said arms 377 and 378 have, respectively, inwardly extending sleeves 381 and 382 attached thereto, and the ends of the rod 375 are seated in said sleeves and adjustably secured therein by lock or set screws 383 and 384, respectively.

The bail 374 may be rocked rearwardly to dispose the rollers 376 against the platen, or moved forwardly toward a vertical position, in which latter adjustment a sheet of paper positioned in the rear of the rollers 376 will be free thereof. The bail 374 is held in its rearward or its forward adjustment position by overcenter action springs 385 and 386, which are attached to spring posts 387 and 388, which extend outwardly from the face of the bail arms 377 and 378, respectively. The spring 385, at its opposite end, is attached to a spring post 389 extending laterally from the plate 270. The spring 386 is anchored at its other end to the said shoulder screw 312. When the bail 374 is moved forwardly past a center position, it is limited to and maintained in its forward position by abutment of the lower end 391 of the arm 377 against a stud 392 on the end plate 270, and abutment of the lower end 393 of the arm 378 against the platen shaft bearing 269. A push link 394 is pivotally secured to the arm 354 of the bell crank lever 351 by a shoulder screw 395 (Figs. 20 and 30). A screw 396 extends outwardly from the end plate 270 above the platen bearing 268. The push link 394 extends between the screw 396 and bearing 268 as guides for its reciprocal movement. When the arm 354 is moved forwardly, the forward end of the push link 394 engages with the spring post 387, which is in its path of movement, and therethrough moves the bail 374 to forward position out of engagement with the platen 113. When the arm 354 is in rearward position, the bail 374 may be snapped inwardly toward the platen 113; its position for holding a paper sheet against the upper forward segment of the platen 113 during printing operations.

The platen 113 comprises a core 400 of wood or metal covered by two layers 401 and 402 of rubber (Figs. 18, 27 and 31). The core 400 has a longitudinal opening 405 therethrough, the right end of which receives a bearing 403 of the configuration shown in Fig. 31. Screws 404 secure the bearing 403 to the core 400. The above-mentioned setscrews 267 secure the bearing 403, and therethrough the platen 113 to the shaft 266 at the right end.

The platen 113 incorporates a fractional linespacing mechanism 406 at the left end (Figs. 18 and 31) which includes a housing 407 formed integral with a hub 408. The hub 408 extends into the core opening 405 with the housing 407 extending partially into the rubber layer 401, which overreaches the layer 402 and the core 400. Screws 409 secure the housing 407 to the core 400. The housing 407 includes four equally spaced slots 410 which receive four extensions 412 of a clutch plate 411 disposed in the housing 407. The clutch plate 411 has a hub 413 surrounding the shaft 266 and receiving two spider springs 414 which bias the plate 411 outwardly. The segmental periphery of the clutch plate 411 has small serrations 416 which match serrations 417 of an internal ring 418 preferably formed integral with the shell 279 above mentioned. As aforesaid, the ratchet wheel 278 is secured to the shell 279 for rotation therewith as by ridges 420 on a hub 421 of the shell 279 and notches 422 in the wheel 278. A spring washer 423 is pressed into a recess 424 in the clutch plate 411 and has a tongue 425 extending into a groove 426 in the shaft 266. A fractional line-space release button 428 has a hollow hub 429 which extends into a central opening in the hub 431 of the wheel or knob 276. A short shaft 432 is disposed in the groove 426 and has a reduced extremity 433 pressed or threaded into the hub 429, the defining shoulder bearing against a washer 434 which, in turn, bears against an inner shoulder of the hub 431 to prevent withdrawal of the shaft 432. A conical compression spring 435 biases the button 428 outwardly.

It is manifest that normally the elements shown in Fig. 18 rotate as a unit, having support in the bearing 269, the serrated clutch plate 411 being engaged with the serrations 417 of the ring 418 in the shell 279 by the action of the springs 414, and the shaft 432 being disengaged from the tongue 425 by the spring 435. Should it be desirable to rotate the platen 113 a fraction of a line space, or sub-line space, as determined by the teeth of the ratchet wheel 278, the release button 428 is pushed inwardly against the spring 435 which engages the end of the shaft 432 with the tongue 425 of the washer 423. Further inward movement of the button 428 moves the clutch plate 411 inwardly against the force of the springs 414, disengaging it from the serrations 417 in the shell 279. The platen 113 may then be freely rotated by either wheel 275 or 276 any degree of rotation desired. On release of the button 428, the springs 414 and 435 return the several elements to normal operating positions.

A rack 436 is suspended from the outer webs 342 of the upper rail member 272 by screws 437 threadedly engaging said rack 436, said rack 436 being spaced from said webs 342 by spacer collars 438. The smooth edge of the rack 436 is disposed adjacent the rear downwardly extending side of the upper rail member 272.

A margin rack 440 and a tabulator rack 442, having teeth 439 and 441, respectively, in the lower edges spaced a character spacing apart, are mounted to the rear of the platen 113 on pairs of screws 443 and 444 which are threadedly anchored in the tabs 294 and 372, respectively (Figs. 14, 30, 31). Spacer collars 445 surround the screws 443 and 444 between the racks 440 and 442. Brackets 446 and 447 are secured between the spacer bands 445 and the rack 440 on the screws 443 and 444, respectively, which support a paper table 449 of the configuration shown in the drawings.

Two margin stops 450 are disposed on the margin rack 440, which are of the shape clearly disclosed in Fig. 31. Each stop 450 includes a side portion 451, a downwardly extending lug 452 secured thereto by welding or brazing adapted to contact a reciprocal stop member particularly described below, a knurled finger piece 453 at the upper end of an arm 454 and end flanges 455 and 456 having openings 457 and 458, respectively, the lower edge 459 of the opening 457 being of reduced thickness forming a tooth which engages between the teeth 439 of the rack 440. A curved leaf spring 460 extends through the openings 457 and 458 and engages the upper edges thereof, the central portion of said spring 460 contacting the upper edge of the rack 440, thereby biasing the tooth edge 459 into engagement between the rack teeth 439. Downward pressure on the thumb piece 453 releases the tooth edge 459 to permit sliding movement of the stop 450. An indicator line 461 is provided above the lug 452 to show the effective position of the stop 450. This line 461 may be aligned to register with graduations on a scale mounted on a paper table and described below.

Tabulator stops 465 are disposed on the tabulator rack 442, each of which includes an inverted U-shaped body member 466, an interior member 467, and a small compression spring 468, the configuration of each being clear from Fig. 63. The body member 466 comprises a bight portion 469, depending legs 470 and 471 having aligned slots 472 to receive the rack 442, and a knurled finger piece 473 disposed at the upper end of an arm 474. The legs 470 and 471 are spaced so that the lower edges 475 of the slots 472 may engage spaced teeth 441 of the rack 442. The leg 470 extends below the leg 471, the lower extremity thereof comprising a stop adapted to contact a reciprocable stop member described below. The interior member 467 is formed from a T-shaped blank into a rectangle to partially surround the rack 442, the extremities 477 of the cross piece or head 478 fitting into the slots 472 of the member 466. The spring 468 is disposed between the top of the head 478 and the inner face of the bight portion 469. Pressure on the finger piece 473 releases the edges 475 from between the teeth 441 of the rack 442 to permit sliding of the stop 465 on the rack 442 for adjustment thereof. An indicator line 476 on the arm 474 may be aligned to register with graduations on a scale described below. The exact place at which the carriage stops during tabulating operation may thus be predetermined.

The paper table 449 is provided of the form shown (Figs. 1, 31, 63 and 64) which includes a front upwardly and rearwardly sloping portion 481, an intermediate relatively flat portion 482, a rear downwardly and rearwardly sloping portion 483, and end cap portions 484. A bracket 485 is welded to the inner face of the rear portion 483 near the left cap portion 484 and a bracket 486 is welded thereto near the right cap portion 484. The brackets 485 and 486 are connected by screws 487 to rearwardly and upwardly directed flanges 488 and 489 of the above-mentioned brackets 446 and 447, respectively, to rigidly mount the paper table 449 to the rear of the platen 113.

The front portion 481 of the paper table 449 has a recess 490 which receives a character spacing scale 491 held in place by three nut and screw assemblies 492. A paper guide 493 having a guide flange 494 is slidably received by the scale 491, being held snugly in position thereon by a bow spring 495. A window 499 in the guide 493 is provided to permit registering of the inside of the guide flange 494 with graduations on the scale 491. An inwardly offset flange 496 depends from the front portion 481 providing a shoulder which rests adjacent the rear upper edge of the paper pan plate 328.

The intermediate portion 482 of the paper table 480 includes two longitudinal slots 497 and 498 through which extend the arms 454 of the margin stops 450 and the arms 474 of the tabulator stops 465, respectively (Figs. 1 and 31). Thus, the knurled finger pieces 453 of the margin stops 450 and the knurled finger pieces 473 of the tabulator stops 465 are readily and instantly accessible at all times for sliding manipulation of the respective stops.

Referring more particularly to the lower rail assembly 104, the supporting elements of which are detailed above, said assembly 104 includes a lower rail member 500 which includes side members 501 connected by a central plate or web 502, provided with cutouts or openings 503, 504 and 505 (Figs. 32-40). An escapement plate 507 comprising a central section 508 having a bifurcated extension 509 at one end and a bifurcated extension 510 at the opposite end is secured to the underface of the web 502 of the lower rail member below the opening 504 by screws 511 and 512 passing through openings in offset termini feet of the arms of the bifurcated extensions 509 and 510, respectively.

A stud 513 (Fig. 37) is riveted to the central section 508 of the escapement plate 507, and extends upwardly therefrom and through the opening 504 (Fig. 39). The stud 513 has journaled thereon an escapement wheel 514 and a pinion 515, the former being mounted upon an axial extension 516 of the latter which is peened over against the former, so that the two members are unitary for cooperative rotation on the stud 513, which constitutes the common axis thereof. Also pivotally mounted on the stud 513 about an enlargement 517 thereof which supports the pinion 515 and escapement wheel 514 and below the escapement wheel 514 and the upper surface of the central section 508 of the escapement plate 507 is a bell crank lever 519 which constitutes a part of the backspace mechanism, described below. These parts just mentioned are retained in rotatable removable relationship by a retaining screw 520.

The upper rail member 272 with its supported platen 113 is mounted for shiftable movement in interfitting relation with the lower rail member 500 on caged ball bearings 522 (Figs. 37 and 41) with the rack 436 thereof meshing with the pinion 515, as is clear from the drawings, during the normal operation of the typewriter 60. The upper rail member 272 is spring urged to the left, as is more particularly described below, which, through the rack and pinion connection aforesaid, tends to rotate the escapement wheel 514 in a counterclockwise direction. The free rotation, however, of the escapement wheel 514 is restrained by an escapement pawl 525 (Fig. 36), pivotally mounted on a shoulder screw 526 threadedly engaging the central section 508 of the plate 507, which includes an escapement wheel detent arm 527 normally engaging a tooth of the escapement wheel 514, and arms 528, 529, 530 and 532, said arms 530 and 532 having upwardly turned terminal flanges 531 and 533, respectively. The depth of the engagement of the detent arm 527 with the teeth of the escapement wheel 514 is adjustable through a movable portion 535 of a flange 536 formed integral with the bifurcated extension 510 and extending upwardly from the inner edge of the rear leg thereof. The free vertical edge of the movable portion 535 is engaged by the arm 529. The portion 535 may be bent by hand to the position desired. Hence, the movable portion 535 limits clockwise movement of the pawl 525.

A tension spring 537 connects the arm 529 of the escapement pawl 525 with an arm 540 of a second escapement pawl 539 of the escapement mechanism pivotally mounted about a shoulder screw 538 threaded into said central section 508, and normally tends to rotate the escapement pawl 525 in a clockwise direction and against the movable portion 535, which position of the parts is illustrated in Fig. 32, so that the detent arm 527 normally engages a tooth of the escapement wheel 514 to prevent counterclockwise rotation. At the same time, the pawl 539 is biased by the spring 537 so that an arm 541 is free of engagement with the teeth of the escapement wheel 514. The pawl 539 also includes an operating arm 543 which includes a downwardly directed end extending between the legs of the bifurcated extension 510 and below the plate 507 for contact by an actuating element more particularly described below for clockwise pivotal movement thereof. The arm 543 contacts an enlargement of the arm 530 in clockwise pivotal movement. Clockwise pivotal movement of the pawl 539 is limited only by its engagement with the escapement wheel 514, counterclockwise movement thereof being limited by the arm 543 striking the edge of the plate 507 between the legs of the extension 510.

Manifestly, clockwise pivotal movement of the pawl 539 by a force applied to the arm 543 will rotate the pawl 525 counterclockwise through contact of the arm 543 with the arm 530, simultaneously disengaging the detent arm 527 from the escapement wheel 514 and engaging the arm 541 with a tooth thereof, permitting the escapement wheel 514 to rotate a fraction of a tooth. As the force is released on the arm 543, the spring 537 draws the arms 529 and 540 towards each other, pivoting the arm 541 of the pawl 539 out of engagement with the escapement wheel 514 and pivoting the detent arm 527 into the path of the tooth thereof immediately following the one previously released by the arm 527, thereby completing the escapement cycle and permitting the slidable carriage assembly 265 to move to the left equal to one character space. The force mentioned is initiated by the spacer bar 237 or a key lever 132 through connections described in detail below.

Unless modified and controlled, the aforesaid clockwise bias of the pawl 525 obtains both on the writing or forward and return or reverse movement of the slidable carriage assembly 265 so that, when the slidable carriage assembly 265 is moved in the return or reverse direction and the rotation of the escapement wheel 514 is clockwise, the detent arm 527 will contact with each succeeding tooth of the wheel 514, thereby causing in the standard construction a recognized objectionable noise or click. This objectionable feature of standard typewriters is overcome by novel construction incorporated in the present typewriter 60, which is disclosed and claimed in our copending application, Serial No. 634,757, filed December 13, 1945 (now Patent No. 2,484,198, October 11, 1949).

The slidable carriage assembly 265, as is usual in machines of the present type, is actuated by a spring motor 548 (Fig. 39) which includes a housing or barrel 549 in the form of a reel comprising inner and outer cup-shaped members 550 and 551, respectively, telescoped one into the other. Lugs 553 formed integral with the inner member 550 extend through slots 561 in the outer member 551 and are bent over at assembly. The other member 551 is formed with two flanges 552 to effect a reel. The barrel 549 is mounted on and secured to a bracket 554 supported from the underface of the plate 502 by screws 547, adjacent to the cutout 505 in said plate 502. A spring barrel anchor 555 is disposed in the housing 549 and includes a hook 556 which engages one end of a clock spring (not shown), the other end of said spring being adapted to engage a hook 557 formed integral with the cup member 550. The anchor 555 has a hub 558 projecting rearwardly and a reduced portion 559 received in a bearing 560 supported by the bracket 554. The outer cup member 551 has a threaded hub 562 mounted therein which surrounds the hub 558.

A friction disc 563 is mounted on the hub 562, said friction disc 563 being provided with a radially outwardly extending offset ear 564 and an angular arm 565 extending rearwardly and outwardly from the disc 563 and positioned approximately ninety degrees from the ear 564. The disc 563 is lightly held against the outer face of the cup member 551 by an annular spring washer 566 and an internally threaded ring 567 threadedly mounted on the hub 562.

A link 569 is pivotally connected at one end to the ear 564 by a slot 570 which surrounds the ear 564 as shown and extends inwardly therefrom, terminating in a flange 571 positioned adjacent the terminal flange 531 of the arm 530 of the escapement pawl 525. The link 569 has sliding support adjacent the flange 571 in a slot 572 formed in a bracket 573 secured to the plate 507 by a suitable screw and anchor prong (Fig. 40). When the link 569 is moved inwardly or to the right, incident to the return movement of the paper carriage as is described below, the terminal flange 531 of the arm 530 is contacted by the flange 571 on the inner extremity of the link 569.

The rotation of the spring motor housing 549 is responsive to the movement of the slidable carriage assembly 265 since a length of cord or thin wire 574, or the like, is wound upon and anchored to the outer cup 551 thereof, the free end of which is formed as a loop 575 and engages an ear 576 projected from the right hand web 342 of the upper rail member 272 (Figs. 14 and 39).

During the return movement of the slidable carriage assembly 265, the spring motor housing 549 rotates in a clockwise direction, imparting a rocking movement in the same direction to the friction disc 563. This moves the link 569 to the right of the typewriter 60 and causes the flange 571 thereof to contact the flange 531 of the arm 530 of the escapement pawl 525, thereby rocking the escapement pawl 525 counterclockwise and restraining it from opposite movement, resulting in moving and holding the arm 527 of the escapement pawl 525 out of the path of movement of the teeth of the escapement wheel 514 during the return movement of the slidable carriage assembly 265. This prevents the arm 527 from contacting the successive teeth of the escapement wheel 514 as it is rotated clockwise incident to the return movement of the slidable carriage assembly 265, eliminating the clicking noise due to the usual contact of the pawl arm 527 on the teeth of the escapement wheel 514. As this operation is brought about by the light frictional engagement of the friction disc 563 with the outer member 551 of the housing 549 of the spring motor 548, it functions without substantially increasing any frictional load on the parts during the return movement of the slidable carriage assembly 265.

Two spaced upwardly and forwardly directed ears 578 are formed integrally with the plate 502, extending from the rear edge of the cutout 505 (Fig. 39). The ears 578 constitute stops limiting the rocking movement of the ear 564 and, thereby, the extent of movement of the link 569. Thus, the extent of rocking movement imparted to the escapement pawl 525 is adjusted to permit the arm 527 thereof to move within and without the path of movement of the teeth on the escapement wheel 514.

Means for tensioning the spring of the spring motor 548 includes an escapement pawl 580 pivotally mounted on the bracket 554 by a shoulder screw 581, and a ratchet wheel 582 mounted on a further reduced portion 583 of the spring anchor 555 and locked for rotation therewith through a flat sided mounting aperture 584, the reduced portion 583 being correspondingly shaped. A screw 585 threadedly engages a threaded well in the reduced portion 583 to secure the ratchet wheel 582 in place and the whole spring motor 548 on the bracket 554. A slot 586 is provided in the spring anchor to receive a screw driver for tensioning the spring motor 548.

It will be understood that, after the slidable carriage assembly 265 has been returned to its normal starting position, the spring motor 548 provides the force tending to move it to the left in the normal step by step feed movement regulated by the escapement mechanism. This movement rotates the friction disc 563 counterclockwise and thereby moves the link 569 to the left, carrying the flange 571 at its extremity out of contact with flange 531 of the arm 530, thereby permitting the arm 527 of the escapement pawl 525 to reengage successively with the teeth of the escapement wheel 514 in the normal step by step feed of the slidable carriage assembly 265.

A backspacer mechanism is provided which includes the aforesaid bell crank lever 519 having arms 590 and 591 (Figs. 34 and 36). A pawl 592 of bell crank form is pivotally mounted on a shoulder screw 593 threaded into the arm 590 for support. A tension spring 595 connected to the free end of the arm 590 and to an arm 596 of the pawl 592 biases the pawl 592 clockwise and into position to engage the escapment wheel 514 when the lever 519 is pivoted clockwise. In rest positions, the arm 590 and the other arm 597 of the pawl 592 contact a post 598 extending upwardly from the plate 507 which limits counterclockwise movement of the former and pivots the latter counterclockwise out of engagement with the teeth of the escapement wheel 514. Clockwise movement of the lever 519 is limited by contact between the rear edge of arm 597 and an upstanding ear or lug 599 formed integral with the plate 507. This contact also locks the pawl 592 in engagement with the escapement wheel 514 and thus prevents overthrow of the carriage in the backspacing action.

A link 600 connects the arm 591 of the lever 519 with the free extremity of a lever 602 pivotally mounted on a shoulder screw 603 threaded into the underside of the left hand bracket 114 (Figs. 33 and 36). The lever 602 includes a downwardly extending ear 604 and a downwardly offset arm 605 of the configuration shown having a cam extremity 606. A spring 601 biases the lever 602 counterclockwise, being connected to the arm 605 and to an ear 607 integral with the bracket 554. The ear 604 is disposed for contact by an ear 608 formed at the end of an arm 609 of a bell crank lever 610 (Figs. 36 and 47) pivotally mounted on a stub shaft 611 mounted in the flanges of the channel member 64. The shaft 611 has a reduced extremity 612 snugly fitting into a small aperture 613 in the lower flange of the channel member 64 and shouldering thereagainst, the other extremity of the shaft 611 being disposed in an aperture 614 in the upper flange of the channel member 64. A collar 615 secured to the shaft 611 by a setscrew 616 locates the lever 610 in the desired position vertically on the shaft 611. The other arm 618 of the bell crank lever 610 is offset downwardly from the arm 609 by an intermediate portion 619. The arm 618 includes a lug 620 which contacts the web of the channel member 64 to limit counterclockwise movement of the bell crank lever 610, and is connected by a link 621 with a bell crank lever (not shown) of the same form as the intermediate bell crank lever 147 except a solid arm replaces the split arm 153, which is pivotally mounted on the rod 148 in the extreme left slot 150 of the bracket 133 outwardly of the effective length of the universal bar 220 and is biased to rest position by a spring 157 as are the levers 147. A key lever 132 bearing a suitably marked finger piece 134 and disposed adjacent the shift key lever 161 actuates the backspacer mechanism.

It is clear from the foregoing that depression of the backspacer finger piece 134 rotates the bell crank lever 610 clockwise (Figs. 36, 39 and 40) thereby contacting the ear 608 with the ear 604 to pivot the lever 602 clockwise. Through the link 600 the bell crank lever 519 is pivoted clockwise thereby moving the pawl 592 from engagement with the port 598 and permitting the spring 595 to pivot the pawl 592 into position to engage a tooth of the escapement wheel 514 to rotate the wheel 514 one tooth clockwise and therethrough move the slidable carriage assembly 265 a character space to the right or reverse to the writing direction. In this backspacing action, the friction disc 563 is held inoperative by the cam extremity 606 of the arm 605 riding over the arm 565 of the friction disc 563, thereby preventing the friction disc 563 from turning with the spring housing 549 and maintaining the flange 571 of the link 569 out of contact with the flange 531 of the arm 530. It is necessary to thus render the friction disc 563 inoperative, for otherwise the pawl 525 of the escapement mechanism would be pivoted out of tooth-engaging position thereby and would be unable to check the escapement wheel 514 after the backspacer pawl 592 had completed its backspacing movement and started towards its position of rest.

Carriage release mechanism 625 is provided for releasing the slidable carriage assembly 265 from the escapement mechanism to permit free transverse sliding movement thereof, which includes a transversely disposed rocking bail 626 having apertured terminal flanges 627 and 628 by which the bail 626 is pivotally mounted on shoulder screws 629 threaded into the end plates 270 and 271 (Figs. 20, 30 and 31). Each of the flanges 627 and 628 includes an arcuate tip 630 and an apertured ear 632. A spring 633 is connected to each ear 632 and to an apertured ear 637 of left and right handle or bail operating levers 635 and 636. The left lever 635 is pivotally mounted on the aforesaid shoulder nut 310 and the right lever 635 is pivotally mounted on a shoulder screw 638 threaded into the end plate 270. Each of the levers 635 and 636 includes a forked arm 640 and a handle arm 641 provided with a finger flange 642 and a stop lug 643. The forked arms 640 engage the respective arcuate tips 630 at all times, being biased by the springs 633 into the rest position clearly shown in Fig. 20, the rear depending side of the upper rail member 272 serving as a stop to limit rearward pivotal movement of the bail 626.

When in rest position, the bail 626 is disposed to the rear of and adjacent to the flange 533 of the arm 532 of the escapement pawl 525, shown in dotted lines in Fig. 32. Forward movement of either finger flange 642 pivots the bail 626 clockwise (as viewed in Fig. 20) or forwardly into contact with the flange 533 to pivot the pawl 525 counterclockwise to release the detent arm 527 from engagement with the teeth of the escapement wheel 514. Since the escapement wheel 514 may now rotate freely, the slidable carriage assembly 265 may be moved freely transversely to the right or left as desired. The stop lugs 643 of the levers 635 and 636 engage the hub 431 and the bearing 268, respectively, to limit forward movement of the levers 635 and 636.

The above-mentioned connection between the escapement mechanism 230 and the spacer bar 237 and the key levers 132 includes a bell crank lever 650 comprising a bearing hub 651 (Figs. 44 and 47), a downwardly and outwardly extending arm 652 apertured at its end, an arm 653 having a vertical flange extension 654 with an angularly bent free end, and an arm 655 having an elongated upwardly extending terminal flange 656. The bearing hub 651 is disposed about a stub shaft 658 having a reduced extremity 659 extending into an aperture 660 in the lower flange of the channel member 64. The upper end of the stub shaft 658 is disposed in an aperture 661 in the upper flange of the channel member 64. Hence, the bell crank lever 650 is disposed between the flanges of the channel member 64 so that the flange extension 654 thereof limits its clockwise pivotal movement by contact with the web of the channel member 64. A wrap spring 662 is disposed about the stub shaft 658 with one end against the web of the channel member 64 and the other end against an edge of the arm 655, biasing the bell crank lever 650 clockwise.

The terminal flange 656 is disposed adjacent the end of the operating arm 543 of the pawl 539 of the escapement mechanism 230 in a position so that counterclockwise movement of the bell crank lever 650 effects clockwise rotation of the escapement pawl 539 which releases the detent arm 527 of the escapement pawl 525 from the escapement wheel 514 and moves the arm 541 into engagement with a tooth of the escapement wheel 514. Reverse rotation of the bell crank lever 650 releases the arm 543 of the pawl 539, thereby permitting the spring 537 to return the detent arm 527 into position to engage the next tooth of the escapement wheel 514 and to withdraw the arm 541 of the pawl 539 out of the path of the teeth of the escapement wheel 514. The above-mentioned pivot screw 229, as aforesaid, connects the rear end of the escapement trip push link 228 to the arm 652 of the bell crank lever 650 (Fig. 7). It is manifest that rearward movement of the push link 228 effected by the spacer bar 237 or a key lever 132 and acting through the universal bar 220 initiates this one character space movement of the escapement wheel 514, repetition of which effects step-by-step movement of the slidable carriage assembly 265.

At the rear of the typewriter 60 mounted upon the channel member 64 are a margin release mechanism 664, a tabulator mechanism 665, a line lock mechanism 666, and a center stop (Figs. 42–44 and 47). A bracket plate 668 is secured by screws 669 and dowels 670 to the rear face of the web of the channel member 64 at substantially the center thereof. The bracket plate 668 includes a horizontal flange 671 having spaced openings 672 and 673 therethrough. An apertured ear 674 extends downwardly from the flange 671.

The margin release mechanism 664 includes a bell crank lever 676 having arms 677 and 678 laterally offset from each other by a web 679 (Fig. 47). The bell crank lever 676 is pivotally supported on a screw 680 which threadedly engages an aperture in the plate 668. A wire clip 681 engages a groove 682 in the end of the screw 680 to maintain the bell crank lever 676 in place. A wire link 683 engages the free end of the arm 678, the other end thereof being connected to an arm 684 of a bell crank lever 685 pivotally mounted on the upper reduced extremity 692 of a spacer member 693 supported by a screw 686 threadedly engaging for support the free end of an arm 687 of a bracket 688 secured by screws 689 to the web of the channel member 64. The bell crank lever 685 includes a second arm 690 to which is connected a wire link 691. The link 691 is connected to the rear arm 154 of an intermediate bell crank lever 147 pivotally mounted on the rod 148 and guided by an outer slot 150 of the bracket 133. The depending arm 153 of the margin release lever 147, which is solid and not bifurcated as are the character levers 147, is disposed opposite the web 223 of the bell crank lever 222, and, hence, does not strike the universal bar 220 in its rearward pivotal movement. A key lever 132, with a suitably marked finger piece 134, cooperates with the margin release intermediate bell crank lever 147, depression of the margin release key lever 132 effecting forward longitudinal movement of the link 691.

A vertically reciprocable carriage stop 695 is pivotally connected to the free end of the arm 677 of the bell crank lever 676 by a shoulder screw 696. The carriage stop 695 includes a flange 697 which extends through the opening 672 in the flange 671 of the bracket plate 668, the opening 672 being of sufficient width to permit a predetermined amount of pivotal movement of the stop 695 transversely of the typewriter 60. A tension spring 698 is connected at one end to a lower part of the carriage stop 695, and at the other end to the ear 674 depending from the flange 671, thereby biasing the carriage stop 695 to its uppermost or extended position and against the right hand edge of the opening 672 (Fig. 42). A shoulder 699 of the carriage stop 695 abuts a lower surface of the flange 671 and limits upward extension of the carriage stop 695. Downward movement of the carriage stop 695 is limited by engagement of the lower extremity thereof with the outer surface of the top flange of the channel member 64.

The flange 697 is adapted to be contacted by the downwardly extending lugs 452 of the margin stops 450 normally disposed at each side of the slidable carriage assembly 265. Downward movement of the margin release key lever 132 through the chain of aforesaid links and levers retracts or moves downwardly the carriage stop 695 to move the flange 697 from the path of the lug 452, permitting the slidable carriage assembly 265 to be moved to the full transverse limits of the platen 113. It is not necessary to press the margin release key lever to permit the slidable carriage assembly 265 to return to the operative limits defined by the lugs 452 of the margin stops 450, since the lugs 452 are inclined to permit riding over and depressing of the flange 697 against the resiliency of the tension spring 698.

The tabulator mechanism 665 includes an elongated tabulator finger 705 which has an offset flange 706 of a configuration to extend through the opening 673 in the flange 671 of the bracket plate 668. The finger 705 has threaded into its lower end a shoulder screw 707 which is pivotally mounted in the extremity of an arm 710 of a bell crank lever 709 which is pivotally mounted on a screw 711 threadedly engaging the bracket plate 668. The screw 711 extends through the arm 710 and a second arm 712 which is offset from the arm 710 by a web 713. The bell crank lever 709 also includes an arm 714 (Fig. 47) having a right angle extension 715 which serves as a stop in contacting the upper flange of the channel member 64 to limit counterclockwise movement of the bell crank lever 709. A wire clip 716, engaging a groove 708 in the end of the screw 711, maintains the bell crank 709 in place. A link 717 is pivotally connected at one end to the lower end of the arm 712 by a shoulder screw 718 which threadedly engages the arm 712. To the other end of the link 717 is connected a wire link 719, the other end of which is connected to one arm 720 of a bell crank lever 721 pivotally mounted on the lower reduced extremity 722 of the spacer member 693. To a second arm 724 of the bell crank lever 721 is connected a wire link 725, the other end of which is connected to an intermediate bell crank lever 147 similar to the margin intermediate bell crank lever 147 and similarly mounted on the rod 148 in respect to the bracket 133 and web 233 of the universal bar 220, being disposed adjacent the margin intermediate lever 147. A tabulator key lever 132 having a suitably marked finger piece 134 cooperates with the tabulator bell crank lever 147 to move the tabulator finger 705 upwardly. A tension spring 726 has one end anchored to the arm 712 of the bell crank lever 709 intermediate the ends thereof and its other end connected to an ear 727 struck out of the web of the channel member 64 which biases the bell crank lever 709 clockwise.

A rocker member 728 of the tabulator mechanism 665 includes an arm 729 and an arm 730, which are offset from each other by a web 731. The member 728 is pivotally mounted on a screw 732 which threadedly engages the bracket plate 668 and which extends through apertures in both the arm 729 and the arm 730. A wire clip 733 engages a groove 734 in the screw 732 to maintain the member 728 in place. At its lower extremity, the arm 729 is pivotally connected to the link 717 intermediate its ends by a shoulder screw 735 which threadedly engages the arm 729. The arm 730 is disposed adjacent the arm 528 of the escapement pawl 525 in a position to move the pawl 525 counterclockwise to release the detent arm 527 from engagement with the escapement wheel 514 at the same time the tabulator finger 705 is being projected upwardly through the opening 673 into the path of the lower extremity of a leg 470 of a tabulator stop 465.

It is manifest, therefore, that downward pressure on the tabulator key finger piece 134 through the aforesaid levers and links substantially simultaneously releases the slidable carriage assembly 265 for movement to the left, or in the writing direction, under the influence of the spring motor 548, and projects the flange 706 of the tabulator finger 705 upwardly into the path of the leg 470 of the next tabulator stop 465. The slidable carriage assembly 265 will thus move to the position as defined by the next tabulator stop 465. Upon release of the tabulator key lever 132, the tabulator finger 705 will be withdrawn from the path of the leg 470 of the tabulator stop 465, and the arm 730 will be rotated clockwise away from the arm 528 of the escapement pawl 525 by the spring 726. The detent arm 527 again moves into the path of the teeth of the escapement wheel 514 through the influence of the spring 537, and the typewriter 60 is ready for the next selected action.

The line lock mechanism 666 includes a lever member 740 having a depending arm 741 and an upwardly extending ear 742 offset from the main portion of the lever member 740 by a web 743 (Figs. 42 and 47). The lever member 740 is pivotally mounted on a screw 744 which threadedly engages the bracket plate 668. A wire clip 745 engages a groove 746 in the end of the screw 744 to maintain the lever member 740 in position. A spring 748 biases the lever member 740 clockwise, having one end connected to the web 743 and the other end through an aperture in the flange 671 of the bracket plate 668. The arm 741 extends through a slot 750 in the upper flange of the channel member 64 and is disposed, when at rest, to the left of the flange 654 of the arm 653 of the bell crank lever 650. The upwardly extending ear 742 is disposed adjacent the lower portion of the flange 697 of the margin stop member 695.

Hence, as the margin stop member 695 is pivoted counterclockwise after contact by the lug 452 of the right hand margin stop 450 as the slidable carriage assembly 265 reaches its set left-handmost position, the flange 697 thereof contacts the ear 742 of the lever member 740 to pivot the arm 741 thereof into a position forwardly of the flange 654 of the bell crank lever 650 which blocks counterclockwise pivotal movement of the bell crank lever 650. Manifestly, when the bell crank lever 650 is thus blocked or locked, both the spacer bar 237 and the key levers 132 are inoperative to release the escapement mechanism 230 or to actuate the type bars 125 to the printing point, and, hence, further writing action of the typewriter 60 is prevented. The lever member 740 returns to its position of rest under the action of the spring 748 as soon as the margin stop member 695 is returned to its rest position against the right hand edge of the opening 672, which is effectuated by the spring 698 which, as aforesaid, both biases the stop member 695 clockwise about the pivotal screw 696 and biases the bell crank lever 676 clockwise.

The center stop for the typewriter 60 comprises the flange 697 of the margin stop member 695. As is clear from the above description of the margin release mechanism 664, the stop member 695 is normally disposed with the flange 697 projecting through the opening 672 and into the path of the lugs 452 of the margin stops 450. Progress of the slidable carriage assembly 265 is stopped by the centrally located flange 697 when either of the said lugs 452 contacts it. Left and right hand margins are based upon this centrally located flange 697.

A bell mechanism 755 is disposed adjacent the bracket plate 668 and to the right thereof (Figs. 44–47). The bell mechanism 755 includes a bell bracket 756 of the confiuration shown including an inwardly offset mount portion 757 through which extend two screws 758 threadedly mounted in the web of the channel member 64. The bracket 756 also includes a side arm 760, a forwardly directed arm 761, and an offset ear 762. A bell 763 is secured to the arm 760 by a screw 764. A bell hammer 765 and a trip lever 766 are pivotally mounted on a shoulder screw 767 which threadedly engages an aperture in the ear 762. A tension spring 768 biases the bell hammer 765 to the position of rest shown in Fig. 45, having one end thereof connected to an ear 770 of the bell hammer 765 and the other end connected to the arm 761. The bell hammer 765 includes a striker portion 771 which is offset inwardly to be disposed within the bell 763, as is clear from Figs. 45 and 46. The trip lever 766 includes an ear 773 which is adapted to contact the inner edge of the bell hammer 765 and a right angularly extending flange 774 which is disposed in the path of the lugs 452 of the margin stops 450.

It is clear that the trip lever 766 is rotated counterclockwise through the contact of the lug 452 of the right hand margin stop 450 with the flange 774. This counterclockwise movement of the trip lever 766 engages the ear 773 thereof with the edge of the bell hammer 765 to rotate the latter counterclockwise against the tension of the spring 768 (Fig. 45). As the lug 452 passes beyond the flange 774 of the trip lever 766, the trip lever 766 is freed and the spring 768 acts upon the bell hammer 765. The tension of the spring 768 and the inertia of the bell hammer 765 are sufficient to pivot the striker portion 771 past its position of rest to strike the bell 763 sharply, giving warning that the line end is being reached.

A ribbon spool mounting and control assembly 785 is mounted on each of the side frame members 61 and 62 between the bracket 133 and the transverse plate 99 of the segment and type bar assembly 94, each assembly 785 being located outwardly of the basket of type bars 125 (Figs. 48–51 and 58). Inasmuch as the two assemblies are identical except that one is a right hand unit and the other a left hand unit, with the further exception of a single detail which is mentioned below, only the left hand one is described herein in detail.

Figure 49:
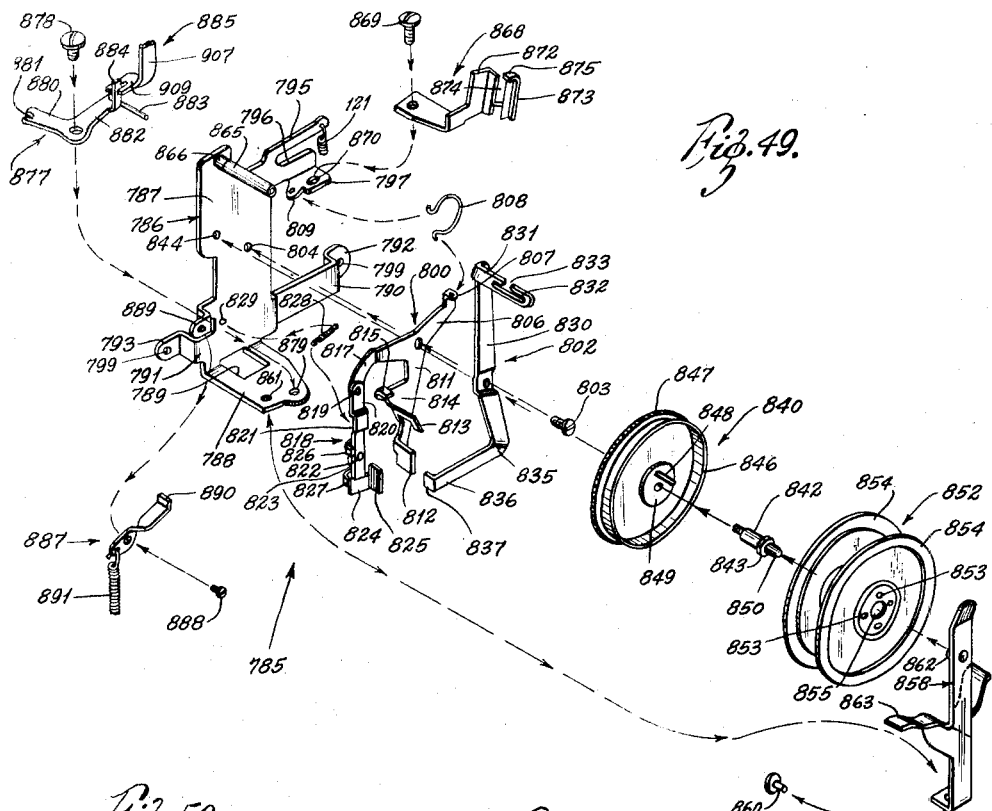
Fig. 49 (Sheet 12) is an exploded view of the assembly of Fig. 48.

The assembly 785 includes a ribbon spool mounting plate 786, which preferably is of the configuration clearly shown in Fig. 49. The plate 786 includes a main body portion 787, a flange 788 extending horizontally inwardly at right angles from the lower edge of the body portion 787 and having a substantially square opening 789 therein, mounting legs 790 and 791 having offset attaching ears 792 and 793, respectively, an arm 795 extending rearwardly from the top edge of the body portion 787, and an arm 796 disposed below the arm 795 and having an ear 797 extending inwardly and substantially horizontally therefrom. The plate 786 is secured to the side frame member 62 of the typewriter 60 by suitable screws 798 which extend through suitable openings in the side frame member 62 and threadedly engage tapped apertures 799 in the ears 792 and 793. The ears 792 and 793 are offset in order to dispose the bracket 786 inwardly of the arms 103.

A bell crank lever 800 and a bell crank lever 802 are pivotally mounted on a shoulder screw 803 which threadedly engages a tapped opening 804 in the main body portion 787 of the plate 786. The lever 800 is disposed between the plate 786 and the lever 802.

The bell crank lever 800 includes an arm 806 having an apertured ear 807 adjacent the end thereof which receives one end of a wire spring 808, the other end being disposed in an aperture in a lug 809 formed integral with the ear 797. The spring 808 maintains the lever 800 in one of two positions, exerting a force to keep the lever 800 to one side or the other of a dead-center position, as is clear from the further description below. The lever 800 also includes a downwardly extending arm 811 which includes a terminal flange or ear 812, a bifurcated flange 813 disposed above the flange 812, as shown, and formed integral with an enlarged intermediate portion 814, and an ear 815 disposed above the flange 813 and formed integral with the intermediate enlarged portion 814. The lever 800 includes a third arm 817 which overreaches the arm 811 and extends downwardly.

A push link assembly 818 is pivotally connected at its upper end to the free extremity of the arm 817 by a rivet 819. The push link assembly 818 includes an elongated link 820 having an intermediate offset portion 821. Pivotally connected to the link 820 near its lower end by a rivet 822 is a second link 824 which includes a right angularly disposed ear or flange 825, an upwardly extending arm 823, and two ears 826 and 827, the former being disposed above and the latter below the pivot rivet 822 and spaced a small distance from and overlying the edge of the link 820 to permit limited pivotal movement of the link 824 relative to the link 820. A spring 828 is connected to an aperture in the arm 823 (Fig. 51) and to an aperture 829 in the plate 786 to bias the push link assembly 818 rearwardly or counterclockwise about the pivot rivet 819 and the link 824 clockwise about the pivot rivet 822. It is clear from the drawings that the push link assembly 818 is disposed forwardly of the flange 788, and that the flange 812 extends into the opening 789 of the flange 788. The front and rear edges of the opening 789 form stops for the flange 812 to limit forward and rearward pivotal movement of the bell crank lever 800.

Figure 50:
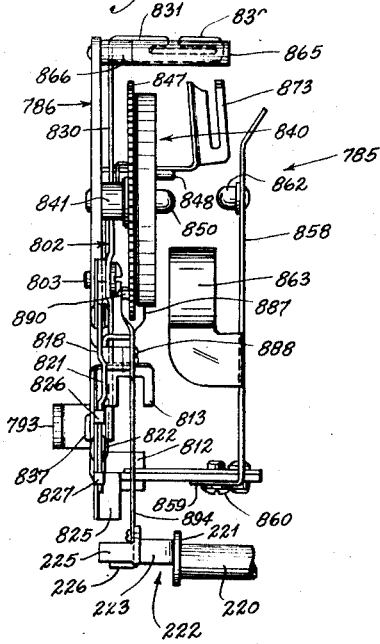
Fig. 50 (Sheet 12) is an enlarged front elevational view of the mechanism shown in Fig. 48.
Figure 51:
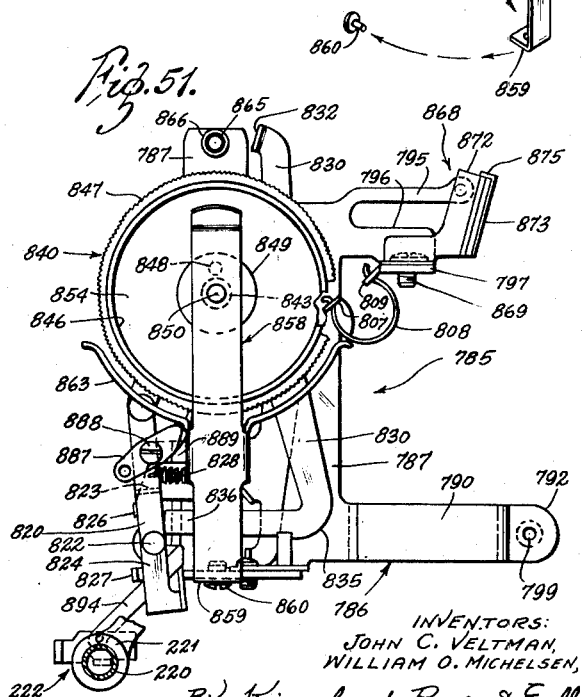
Fig. 51 (Sheet 12) is a side elevational view of the mechanism shown in Fig. 50 on the same scale.

The bell crank lever 802 includes an upwardly extending arm 830 having a terminal flange or ear 831 with a ribbon slot 832 therein having an opening 833 (Figs. 49-51). The lever 802 also includes a downwardly extending arm 835 having an angularly extending portion 836 terminating in a flange 837. When mounted on the plate 786, the angular extension 836 is disposed between the bifurcated flange 813 and the flange 812 of the arm 811 with the flange 837 disposed adjacent the edge of the link 820 above the pivot rivet 822.

A ribbon spool retainer assembly 840 having a bearing hub 841 is mounted on the shoulder portion 842 of a shoulder stud 843 which threadedly engages a tapped aperture 844 in the plate 786. The retainer assembly 840 includes a cup-shaped member 846 secured to the bearing hub 841, to the back of which is secured a ratchet disc 847 for rotation therewith. A ribbon spool drive pin 848 is secured to a flange 849 of the bearing hub 841. The stud 843 includes a pivot portion 850 which receives a ribbon spool 852. The ribbon spool 852 has a number of holes 853 in each of the spaced discs 854, into one of which extends the ribbon spool drive pin 848. The ribbon spool 852 includes a bearing hub 855 which is mounted on the pivot portion 850 of the stud 843.

A spring arm 858, having a flange 859 at its lower end, is secured to the flange 788 of the plate 786 by a screw 860 which extends through the flange 859 and threadedly engages a tapped aperture 861 in the flange 788. The spring arm 858 includes a pivot stud 862 which extends into the bearing hub 855 of the ribbon spool 852 to lend pivot support, the spring arm 858 maintaining the spool 852 in place. The spring 858 also includes a pair of arms 863 which are shaped to form a trough beneath the ribbon spool 852, as is clear from the drawings, to retain ribbon slack and to approximately locate the ribbon spool 852 when it is being inserted in position on the pivot portion 850 and the pivot stud 862.

A ribbon roller 865 is rotatably mounted on the reduced extension of a stud 866 riveted to the plate 786. The roller 865 receives a ribbon from the ribbon spool 852. Rearwardly of the roller 865 is a ribbon guide 868 which is secured to the ear 797 of the plate 786 by a screw 869 which threadedly engages a tapped aperture 870 in the ear 797. The ribbon guide 868 includes an angular upstanding flange 872 which has a portion 873 rearwardly and inwardly offset therefrom to provide a ribbon slot 874. The portion 873 has an ear 875 at the top to retain a ribbon in the slot 874.

A bell crank lever 877 is pivotally mounted on a shoulder screw 878 which threadedly engages a tapped aperture 879 in the flange 788 of the plate 786. The lever 877 includes an arm 880 having a slot 881 extending inwardly from the end thereof which engages the outer vertical edge of the flange 812. The lever 877 includes a second arm 882 having an aperture in the end thereof which receives one end of a wire link 883 and an upwardly extending ear 884 which is engaged by a manual ribbon direction change lever 885 (Figs. 7 and 49). It is to be understood that the link 883 is connected to a right hand bell crank lever 877 forming part of the right hand assembly 785 which is identical with the left hand bell crank lever 877 just described except the ear 884 is omitted since only one direction change lever 885 is necessary. This is the detail mentioned above as being different in the left and right hand assemblies 785.

A check pawl 887 is pivotally mounted on a screw 888 which threadedly engages a tapped aperture in an inwardly offset ear 889 of the plate 786. The check pawl 887 includes a tooth 890 which is adapted to engage the teeth of the ratchet disc 847. One end of a tension spring 891 is connected to the check pawl 887 to bias the tooth 890 into engagement with the teeth of the ratchet disc 847. The other end of the spring 891 is connected to a feed pawl 893 (Fig. 48) intermediate the ends thereof to bias the feed pawl 893 towards engagement with the teeth of the ratchet disc 847. The feed pawl 893 comprises an elongated spring arm 894 having an upper portion 895 terminating in a tooth 896, said upper portion 895 being offset from a lower portion 897 by an angularly disposed web portion 898. The feed pawl 893 is pivotally connected to the offset returned portion 224 of the bell crank lever 222 secured to the left end of the universal bar 220. Hence, the feed pawl 893 is actuated by pivotal movement of the universal bar 220, being moved upwardly and rearwardly to engage the tooth 896 with a tooth of the ratchet disc 847 as the universal bar 220 is pivoted rearwardly. In its reciprocating movement, the feed pawl 893 engages the inner edge of the bifurcated flange 813, being disposed between the legs thereof. The angular portion 898 moves back and forth through the bifurcation of the flange 813 to facilitate engagement of the tooth 896 with the teeth of the ratchet disc 847 and to withdraw the same therefrom.

In Fig. 48, the tooth 896 is shown in fully withdrawn position. As the feed pawl 893 is moved upwardly and rearwardly, the angularly bent portion 898 moves through the flange 813, bringing the plane of the lower portion 897 into engagement with the inner edge thereof, which, in effect, vertically lifts the upper portion 895 and the tooth 896 an amount equal to the offset distance between the upper portion 895 and the lower portion 897. The check pawl 887 rides freely over the teeth of the ratchet disc 847 when the latter is rotated counterclockwise, as viewed in Fig. 48, but prohibits clockwise movement thereof.

The manual ribbon direction change lever 885 is of bell crank formation and is pivotally mounted about a shoulder screw 900 which has threaded engagement with a horizontal arm 901 of a bracket 902 which is secured to the rear wall of the bracket 133 (Figs. 7 and 49). The lever 885 includes an arm 903 which terminates in a serrated thumb edge 904 that extends through an opening 906 in the mask cover 84 (Fig. 1). The lever 885 also includes an arm 907 having a downwardly directed extension 908 which terminates in a bifurcated horizontal flange 909 (Fig. 49). The arms 903 and 907 have downwardly extending ears 910 and 911, respectively, located near the pivot screw 900 and adapted to contact the horizontal arm 901 of the bracket 902 to limit pivotal movement of the lever 885. The bifurcated flange 909 straddles the ear 884 of the bell crank lever 877.

The feed pawl 893 of only one assembly 785 is operatively disposed for driving the ratchet disc 847 at a time; the feed pawl 893 and its associated check pawl 887 of the other assembly 785 remain inoperative. The operative position of the bell crank lever 800 is shown in Fig. 48, in which position the flange 812 of the arm 811 is disposed against the front edge of the opening 789 in the flange 788, and the link assembly 818 is in elevated position. The spring 808 biases the lever 800 clockwise to maintain it in this aforesaid operative or drive position. Both the bell crank lever 802 and the push link assembly 818 are biased to the rear or counterclockwise by the spring 828. The check pawl 887 is disposed between the ear 815 and the top edge of the bifurcated flange 813 and engages the teeth of the ratchet disc 847 through the action of the spring 891. The spring 891 also biases the feed pawl 893 into position against the inner edge of the bifurcated flange 813. Since the feed pawl 893 is pivoted to the universal bar 220, as aforesaid, when in this operative position the feed pawl 893 will feed a ribbon on the ribbon spool 852 a predetermined amount every time the universal bar 220 is moved rearwardly through the depression of a character key lever 132.

A ribbon on the ribbon spool 852 may be reversed in its travel either manually by manipulation of the direction change lever 885 or automatically by the ribbon, as is set out below. To reverse manually, the arm 903 of the lever 885 is pivoted to the left, which, through the engagement of the bifurcated flange 909 with the ear 884 of the bell crank lever 877, pivots the bell crank lever 877 clockwise (Fig. 48), which, in turn, moves the bell crank lever 800 counterclockwise to its inoperative position which will be maintained by the spring 808 since the ear 807, to which the spring 808 is connected, is moved across center by the pivotal action. This pivotal movement of the bell crank lever 800 renders both the check pawl 887 and the feed pawl 893 inoperative since the ear 815 moves downwardly against the check pawl 887 to restrain it from engagement with the teeth of the ratchet disc 847 and the bifurcated flange 813 does likewise in respect to the feed pawl 893. The push link assembly 818 is moved downwardly to a position so that the lower end thereof is adjacent the flange 226 of the bell crank lever 222 secured to the end of the universal bar 220. It is to be noted that the lower end of the push link assembly 218 is normally maintained out of the path of movement of the flange 226 by the spring 828. It is, of course, to be understood that, as one assembly 785 is rendered inoperative, as aforesaid, the other assembly 785 is rendered operative through the link 883 and the other bell crank lever 877 to feed the ribbon, thereby reversing the ribbon's direction.

As stated, automatic reversal of the ribbon is effected by the ribbon itself. When a ribbon on the ribbon spool 852 is moved in use in one direction, as its end is reached a rivet, or the like, which is provided on all standard ribbons at each end thereof, engages the slot 832 of the bell crank lever 802 which permits free passage of the ribbon, but is too narrow to permit the rivet to pass. When the rivet reaches the slot 832 of the lever 802 of one assembly 785, further ribbon feeding action by the other assembly 785 results in a clockwise pivotal movement of the bell crank lever 802, which drives the flange 837 thereof forwardly to move the push link assembly 818 forwardly or clockwise about the pivot rivet 819 to dispose the flange 825 at the lower end of the push link assembly 818 in the path of the rearwardly moving flange 226 at the end of the universal bar 220. The flange 226 moves the push link assembly 818 vertically by contact with the flange 825, thereby pivoting the bell crank lever 800 clockwise from its inoperative position to its operative position shown in Fig. 48. Simultaneously, the bell crank lever 800 of the assembly 785 at the other side of the typewriter 60 is moved to an inoperative position through the two bell crank levers 877 and by the link 883. The check pawl 887 and the feed pawl 893 of the previously inoperative assembly 785 are now disposed in operative relation with the ratchet disc 847 due to the upward clockwise movement of the bifurcated flange 813 and the ear 815.

A vibrator and bichrome selector mechanism 920 is provided to control the ribbon at the writing point and to select that portion of the ribbon which is to be contacted by the type block 126 of a type bar 125 (Figs. 54-57). A vibrator 921 of thin material includes a rearwardly offset guide portion 922 disposed in an opening 923 in an ear 924 formed integral with and centrally of a bracket 926 which is secured by suitable screws 927 to the outer face of the front side member 501 of the lower rail member 500. The vibrator 921 includes upwardly extending spaced arms 928 having slots 929 therein adapted to receive a ribbon. An opening 930 is provided in each slot 929 for insertion of a ribbon. The vibrator 921 also includes a shoulder 931 which is disposed in a notch 932 (Fig. 7) formed in the base portion of the type bar guide 131, but out of contact therewith. The upper surface of the shoulder 931 is adapted to contact a stop 933 formed integral with a card scale 934 secured by suitable screws 935 to upstanding ears 936 of the bracket 926. The vibrator 921 is disposed between the scale 934 and the type bar guide 131. The stop 933 is adjustable through manual bending to determine the upward limit of movement of the vibrator 921.

A bell crank lever 938 is pivotally mounted on a shoulder screw 939 threadedly engaging the upper portion of an ear 940 formed integral with and extending upwardly from one end of the bracket 926. The bell crank lever 938 includes one arm 941 pivotally mounted at its end to a projection 942 of the vibrator 921. A second arm 943 has a wire link 944 connected to its end. The other end of the wire link 944 is connected to an arm 945 of a bell crank lever 946 which is pivotally mounted on a shoulder screw 947 threadedly engaging a horizontal arm 948 of a bracket 949 secured by screws 950 to the transverse plate 99 and to the arm 103 (Fig. 54). The arm 945 has a lug 951 extending from one side which contacts a vertical adjustable flange 952 of the horizontal arm 948 of the bracket 949 to adjustably limit clockwise movement of the bell crank 946 and thus adjustably position the vibrator 921 at its inoperative or rest position, said bell crank 946 being biased to the position shown in Fig. 54 by a tension spring 953, one end of which is secured to a second arm 954 of the bell crank lever 946 and the other end of which is connected to a vertical flange 955 of a stop arm 956 pivotally mounted on a shoulder screw 957 which threadedly engages the underside of the bracket 949 to bias the latter counterclockwise. The flange 955 includes an angular extremity 958 which serves as a vibrator overthrow stop for the balled end 959 of the arm 943 of the bell crank lever 938 when the stop arm 956 is in its extreme left hand position, considering Fig. 54, to prevent overthrow of the vibrator 921 when raised to its intermediate position, particularly described below.

The arm 954 of the bell crank lever 946 is formed, as shown in Fig. 54, with two notches 960 and 961 in the rear edge between which is disposed a slot 962. A downwardly directed flange 964 of a pull member 965 (Fig. 55) is disposed to engage selectively the notches 960 and 961 and the slot 962. The pull member 965 is loosely pivotally connected by a screw 966 to an ear 967 of a U-shaped bracket 968 pivotally mounted on the rod 136. The pull member 965 is thus loosely and pivotally mounted to permit lateral movement of the free end thereof and pivotal movement at the screw 966. The bracket 968 includes an arm 969 integral with one of its legs to which is connected a wire link 970, the other end of said link 970 being connected to the free end of the arm 221 of the right hand universal bar bell crank lever 222.

A pull member guiding lever 972 is pivotally connected by a shoulder screw 973 to a horizontal flange 974 of a bracket 975 secured by a screw 976 to the rear wall of the aforesaid bracket 133. The lever 972 extends forwardly and terminates in a serrated thumb edge 977 by which the lever 972 is adapted to be pivoted. The forward end of the lever 972 includes a boss 978 formed downwardly which cooperates with three apertures 979 formed in the flange 141' of the comb 141. Ears 980 are struck out of the flange 141' and serve as right and left hand stops for the lever 972. A spring 981 is secured to the underside of the lever 972 by a rivet 982 and includes a free end portion 983 which engages the underside of the flange 141' to maintain the lever 972 in engagement with the upper face of the flange 141'. An opening 988 is provided in the mask cover 84 through which the serrated thumb end 977 extends. The other end of the lever 972 includes a downwardly extending portion 984 having a slot therein which receives an arm 985 of the pull member 965 for guiding the pull member 965 in its forward and rearward longitudinal sliding movement and for moving the pull member 965 transversely to dispose the downwardly extending flange 964 thereof in a selected position. The lever 972 also includes a horizontal offset extension 986 having a down- wardly extending ear 987 which is adapted to engage the flange 955 when the flange 964 of the pull member 965 is positioned for engagement with the notch 961 to dispose the angular extremity 958 of the stop arm 956 in the path of the balled end 959 of the arm 943 of the bell crank lever 938 to limit clockwise movement of the bell crank lever 938 and, hence, to limit the upward movement of the vibrator 921.

It is clear from the foregoing that the vibrator 921 remains in its position of rest when the flange 964 of the pull member 965 is disposed in the slot 962, since forward longitudinal movement of the pull member 965, effected by the universal bar 220, does not pivot the bell crank lever 946 as the depth of the slot 962 is such as to give free non-effective sliding movement to the flange 964. When the lever 972 is pivoted from its central position to engage the flange 964 of the pull member 965 with the notch 960, operation of one of the character key levers 132 will, through the universal bar 220, the pull member 965, the bell crank lever 946, and the bell crank lever 938, move the vibrator 921 to its maximum height, since the angular extremity 958 through the action of the spring 953 is out of the path of the balled end 959 of the arm 943, the position of the stop arm 956 for this position of the pull member 965 being shown in dotted lines in Fig. 54. When the pull member 965 is moved laterally to dispose the flange 964 thereof in position for engagement with the notch 961, the angular extremity 958 is moved into the path of the balled end 959 of the arm 943 through the camming action of the ear 987, which is clear from Figs. 54 and 55. Depression of a character key lever 132 will move the vibrator 921 vertically only an amount sufficient to place the top half of the ribbon in a position to be struck by the character on the type block 126 of a type arm 125.

A touch control mechanism 990 is provided, which includes a frictional slide member 991 disposed beneath the flange 141' of the comb 141 (Figs. 59-62). An operating post 992 has a reduced threaded extremity extending through a slot 993 in the flange 141' to engage the slide member 991. A spring washer 989 and a friction washer 989' are disposed between the flange 141' and a shoulder formed as part of the operating post 992 to insure position maintenance of the post 992 (Fig. 60). The slide member 991 has one terminal flange 994 to which is connected one end of an elongated tension spring 995, the other end thereof being connected to an ear 996 struck downwardly from the flange 141'. The slide member 991 also includes a second terminal flange 997 which is bifurcated and receives a looped end 998 of a wire 999 which passes over a convex portion 1000 of a bracket 1001. The wire 999 passes under terminal tabs 1002 and 1003 of the bracket 1001 to maintain it in frictional engagement with the convex portion 1000. The wire 999 terminates in a tension spring 1004, the free end of which is connected to the free end of the arm 221 of the left hand universal bar bell crank lever 222. It is clear that the position of the post 992 determines, within established minimum and maximum limits, the effective tension of the spring 1004 on the universal bar 220, and, hence, on a character key lever 132, the spring 1004 at all times exerting a pull on the universal bar 220. The spring 995 is employed for counterbalance effect.

A carriage center lock 1010 is provided which includes a bell crank lever 1011 pivotally mounted on a shoulder screw 1012 threadedly engaging the web 502 of the lower rail member 500 at the right end thereof (Figs. 35 and 39). The bell crank lever 1011 includes an arm 1013 having a downwardly turned ear 1014 which has an aperture receiving one end of a wire spring 1015, the other end of which is engaged in an opening 1016 in the web 502. The downwardly turned ear 1014 extends into a slot 1017 formed in the web 502 and opening into the cut-out 503. The bell crank lever 1011 also includes an arm 1018 having an upwardly offset portion 1019 which has a slot 1020 in the rear edge thereof and a serrated finger flange 1021 at the free end thereof. Leading to the slot 1020 are convex camming surfaces 1022. An arm 1023 terminates in an upturned ear 1024 which is adapted to be contacted by the bail 626 when the lock 1010 is in locking position to release the slidable carriage assembly 265.

The bell crank lever 1011 is shown in Fig. 39 in inoperative position, which is maintained by the spring 1015 biasing the ear 1014 against the rear edge of the slot 1017. The bell crank lever 1011 may be pivoted to operative position by applying the finger to the finger flange 1021 and moving the arm 1018 rearwardly, which effects an over-center movement of the spring 1015 in respect to its pivotal connections and the pivotal screw 1012, so that the spring 1015 biases the ear 1014 into engagement with the forward edge of the slot 1017. In this position of the bell crank lever 1011, the slot 1020 is disposed to receive a lug 1025 integral with the right end of the slidable carriage assembly 265 to center the slidable carriage assembly 265 in respect to the lower guide rail 500, in which position the typewriter 60 is ready to be disposed in a carrying case. The camming surfaces 1022 facilitate engagement of the lug 1025 with the slot 1020, pivoting the bell crank lever 1011 clockwise against the force of the spring 1015 to permit the lug 1025 to be engaged by the slot 1020.

Inasmuch as the operation of each of the several mechanisms making up the present novel typewriter has been described in conjunction with the particular description thereof, it is unnecessary to include further operational description. The manner of operating the typewriter 60 is clear from the foregoing description taken with the accompanying drawings.

It is manifest that there has been provided a novel typewriter which fulfills all of the objects and advantages sought therefor.

It is to be understood that the foregoing description and the accompanying drawings have been given by way of illustration and example. It is also to be understood that changes in form of the several parts, substitution of equivalent elements and rearrangement of parts, which will be readily apparent to one skilled in the art, are contemplated as within the scope of the present invention, which is limited only by the claims which follows:

What is claimed is:

1. In a typewriting machine, a type action comprising a pivotally mounted key lever, and a pivotally mounted intermediate lever adjacent said key lever and in the same plane therewith, said key lever having an arm depending therefrom between the pivot point and the free end thereof, said intermediate lever having a bifurcated arm depending below its pivot point, said depending arm of said key lever being in thrust engagement with one fork of the depending arm of said intermediate lever.

2. In a typewriting machine, a type action comprising a pivotally mounted key lever, and a pivotally mounted intermediate lever adjacent said key lever and in the same plane therewith, said key lever having an arm depending therefrom between the pivot point and the free end thereof, said intermediate lever having a bifurcated arm depending below its pivot point, said depending arm of said key lever being in thrust engagement with one fork of the depending arm of said intermediate lever, said key lever being gravity dependent for rest engagement of said key lever arm with said intermediate lever arm.

3. In a typewriting machine, a type action comprising a pivotally mounted key lever, and a pivotally mounted intermediate lever adjacent said key lever and in the same plane therewith, said key lever having an arm depending therefrom between the pivot point and the free end thereof, said intermediate lever having a bifurcated arm depending below its pivot point, said depending arm of said key lever being in thrust engagement with one fork of the depending arm of said intermediate lever, the forks of said bifurcated arm being bendable towards and from each other for adjustment, the fork not engaged by said key lever arm being adapted to engage a universal bar.

4. In a typewriting machine, a type action comprising a pivotally mounted key lever, a pivotally mounted intermediate lever adjacent said key lever and in the same plane therewith, said key lever having an arm depending therefrom between the pivot point and the free end thereof, said intermediate lever having a bifurcated arm depending below its pivot point, said depending arm of said key lever being in thrust engagement with one fork of the depending arm of said intermediate lever, said key lever being gravity dependent for rest engagement of said key lever arm with said intermediate lever arm, and means for limiting return movement of said key lever.

5. In a typewriter, a simplified type action comprising an operating sequence of four elements, said sequence including a type bar, an intermediate lever, a member connecting said type bar and intermediate lever, and a key lever, said intermediate lever including a bifurcated arm one fork of which is engaged by the key lever and the other fork of which is adapted to contact a universal bar.

6. In a typewriter, a simplified type action comprising an operating sequence of four elements, said sequence including a type bar, an intermediate lever, a member connecting said type bar and intermediate lever, and a key lever, said intermediate lever including a bifurcated arm one fork of which is engaged by the key lever and the other fork of which is adapted to contact a universal bar, the forks of said bifurcated arm being bendable towards and from each other to provide adjustment in respect to contact thereof.

7. In a typewriting machine, a type action including a pivotally mounted type bar, a pivotally mounted intermediate lever including a bifurcated arm, means connecting said type bar and intermediate lever for movement of one by the other, and a pivotally mounted key lever having an arm in contact with one fork of the arm of the intermediate lever, whereby pivotal movement of said key lever in one direction effects pivotal movement of said type bar, the other fork of the arm of the intermediate lever being adapted to engage a universal bar.

8. In a typewriting machine, a type action including a pivotally mounted type bar, a pivotally mounted intermediate lever having a bifurcated arm, a link connecting said type bar and said intermediate lever, and a pivotally mounted key lever having an arm in thrust relationship with one fork of said bifurcated arm of said intermediate lever, said other fork of said bifurcated arm being adapted to engage a universal bar.

9. In a typewriting machine, a plurality of pivotally mounted type bars, a plurality of pivotally mounted intermediate levers each having a bifurcated arm, a member connecting each type bar with an intermediate lever, and a plurality of pivotally mounted key levers, each key lever being operatively disposed relative to an intermediate lever for direct contact with one fork of the bifurcated arm thereof to pivot the same upon pivotal movement of said key lever.

JOHN C. VELTMAN.
WILLIAM O. MICHELSEN.

REFERENCES CITED

The following references are of record in the file of this patent:

UNITED STATES PATENTS

| Number | Name | Date |
|---|---|---|
| 478,223 | Clemons | July 5, 1892 |
| 510,984 | Merritt | Dec. 19, 1893 |
| 722,006 | Fox | Mar. 3, 1903 |
| 729,457 | Wagner | May 26, 1903 |
| 979,355 | Tanner | Dec. 20, 1910 |
| 997,374 | Davis | July 11, 1911 |
| 1,028,159 | Utz | June 4, 1912 |
| 1,082,671 | Albertson | Dec. 30, 1913 |
| 1,250,226 | Roebuck | Dec. 18, 1917 |
| 1,317,482 | Burridge | Sept. 30, 1919 |
| 1,347,632 | Holden | July 27, 1920 |
| 1,520,387 | Benson | Dec. 23, 1924 |
| 1,525,034 | Holden | Feb. 3, 1925 |
| 1,526,844 | Dowd | Feb. 17, 1925 |
| 1,559,167 | Hess et al. | Oct. 27, 1925 |
| 1,635,672 | Hess | July 12, 1927 |
| 1,673,289 | Kurowski | June 12, 1928 |
| 1,820,903 | Avery | Sept. 1, 1931 |
| 1,826,780 | Harmon | Oct. 13, 1931 |
| 1,858,770 | Etheridge | May 17, 1932 |
| 1,983,831 | Avery | Dec. 11, 1934 |
| 2,027,509 | Avery | Jan. 14, 1936 |
| 2,056,364 | Petz | Oct. 6, 1936 |
| 2,120,360 | Hillis | June 14, 1938 |
| 2,240,477 | Bauder | May 6, 1941 |
| 2,337,593 | Dobson | Dec. 28, 1943 |

FOREIGN PATENTS

| Number | Country | Date |
|---|---|---|
| 445,080 | Great Britain | of 1936 |
| 462,090 | Great Britain | of 1937 |